US008923559B2

(12) United States Patent
Kimura et al.

(10) Patent No.: US 8,923,559 B2
(45) Date of Patent: Dec. 30, 2014

(54) IMAGE PROCESSING APPARATUS, IMAGE PROCESSING METHOD, AND PROGRAM

(75) Inventors: Jun Kimura, Tokyo (JP); Akio Ohba, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 296 days.

(21) Appl. No.: 13/485,075

(22) Filed: May 31, 2012

(65) Prior Publication Data

US 2012/0314902 A1 Dec. 13, 2012

(30) Foreign Application Priority Data

Jun. 7, 2011 (JP) ................................. 2011-127331

(51) Int. Cl.
*G06K 9/00* (2006.01)
(52) U.S. Cl.
CPC .................................. *G06K 9/00355* (2013.01)
USPC .......................................... 382/103; 382/195
(58) Field of Classification Search
USPC .......................................... 382/103, 195, 181
See application file for complete search history.

(56) References Cited

U.S. PATENT DOCUMENTS 7,308,112 B2 * 12/2007 Fujimura et al. ............... 382/103
7,460,687 B2 * 12/2008 Yokoyama .................... 382/103
8,666,115 B2 * 3/2014 Perski et al. ................... 382/103

FOREIGN PATENT DOCUMENTS

JP 8-315154 11/1996
JP 2008-52590 3/2008

* cited by examiner

*Primary Examiner* — Yon Couso
(74) *Attorney, Agent, or Firm* — Finnegan, Henderson, Farabow, Garrett & Dunner, L.L.P.

(57) ABSTRACT

Provided is an image processing apparatus including a hand shape recognition unit that performs hand shape recognition on an input image to detect a position and a size of a hand with a specific shape in the input image, a determination region setting unit that sets a region in a vicinity of the hand on the input image as a determination region used to recognize a gesture performed using the hand, based on the position and the size of the hand, and a gesture recognition unit that recognizes the gesture by monitoring movement of the hand to the determination region.

10 Claims, 18 Drawing Sheets

FIG. 1
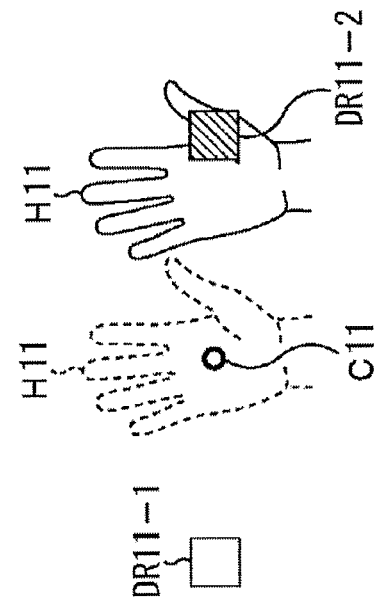
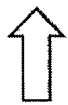
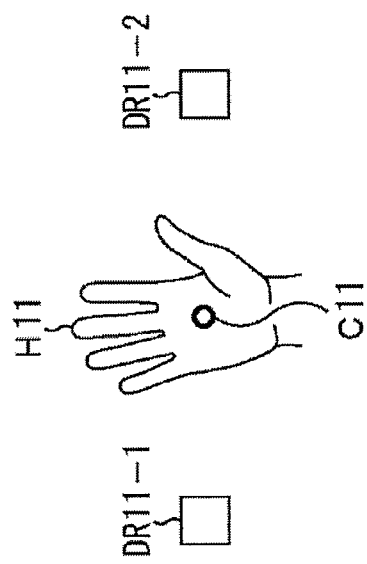

IMAGE PROCESSING APPARATUS, IMAGE PROCESSING METHOD, AND PROGRAM

BACKGROUND

The present technology relates to an image processing apparatus, an image processing method, and a program, and more particularly, to an image processing apparatus, an image processing method, and a program capable of recognizing a hand gesture at higher speed and with higher accuracy.

In the related art, technologies of performing a process in response to a gesture (a movement of a hand) when a user performs the gesture determined in advance with his or her hand have been known.

In these technologies, it is necessary to recognize a gesture of a user. As methods of recognizing a gesture, methods of using a region of a specific color on an image or a region of a moving subject have been suggested (for example, see Japanese Unexamined Patent Application Publication No. 08-315154 and Japanese Unexamined Patent Application Publication No. 2008-52590). For example, in a method of using the region of a specific color, the color of a hand is extracted from an image and a gesture is recognized based on a movement of the region of the color. Further, in a method of using the region of a moving subject, a region at which there is movement is specified based on a difference between frames of an image and a gesture is recognized based on the movement of the region.

SUMMARY

In the above-described technologies, however, a gesture of a user may rarely be recognized at high speed and with high accuracy.

For example, in the methods using the region of a specific color or the region of a moving subject, it is necessary to set the entire image as a monitoring target and recognize a hand gesture of a user. Therefore, since it is necessary to process a large throughput, it may take time to recognize the gesture and the recognition accuracy of the gesture may deteriorate. In order to improve the recognition accuracy of the gesture even slightly, the user has to move his or her hand considerably.

Further, when a gesture is recognized using the region of a moving subject, there is a concern that erroneous recognition may occur depending on the surrounding environment of a user such as an environment in which there is a moving subject other than the hand movement of a user.

It is desirable to provide an image processing apparatus, an image processing method, and a program capable of recognizing a gesture at higher speed and with higher accuracy.

According to an embodiment of the present technology, there is provided an image processing apparatus including: a hand shape recognition unit that performs hand shape recognition on an input image to detect a position and a size of a hand with a specific shape in the input image; a determination region setting unit that sets a region in a vicinity of the hand on the input image as a determination region used to recognize a gesture performed using the hand, based on the position and the size of the hand; and a gesture recognition unit that recognizes the gesture by monitoring movement of the hand to the determination region.

The determination region setting unit may set a plurality of the determination regions in the vicinity of the hand on the input image.

The plurality of determination regions may be regions used to recognize a plurality of the gestures different from each other.

The image processing apparatus may further include a processing unit that performs a process in accordance with the result of the gesture recognition.

The gesture recognition unit may recognize the gesture by comparing a color extracted from a region of the detected hand with a color of the determination region on the input image.

The gesture recognition unit may recognize the gesture by monitoring the movement of the hand to the determination region based on a difference between frames of the input image.

The hand shape recognition unit may detect positions and sizes of the hand with a plurality of shapes determined in advance.

When a position and a size of the hand with a specific shape are newly detected, the determination region setting unit may set the determination region based on the newly detected shape, position, and size of the hand.

According to another embodiment of the present technology, there is provided an image processing method or a program including performing hand shape recognition on an input image to detect a position and a size of a hand with a specific shape in the input image; setting a region in a vicinity of the hand on the input image as a determination region used to recognize a gesture performed using the hand, based on the position and the size of the hand; and recognizing the gesture by monitoring movement of the hand to the determination region.

According to the embodiments of the present technology, the hand shape recognition on the input image is performed to detect the position and the size of the hand with the specific shape in the input image; the region in the vicinity of the hand on the input image is set as the determination region used to recognize the gesture performed using the hand based on the position and the size of the hand; and the gesture is recognized by monitoring movement of the hand to the determination region.

According to the embodiments of the present technology described above, a gesture can be recognized at higher speed and with higher accuracy.

BRIEF DESCRIPTION OF THE DRAWINGS

FIG. 1 is a diagram illustrating the overview of embodiments of the present technology;

DETAILED DESCRIPTION OF THE EMBODIMENTS

Figure 2:
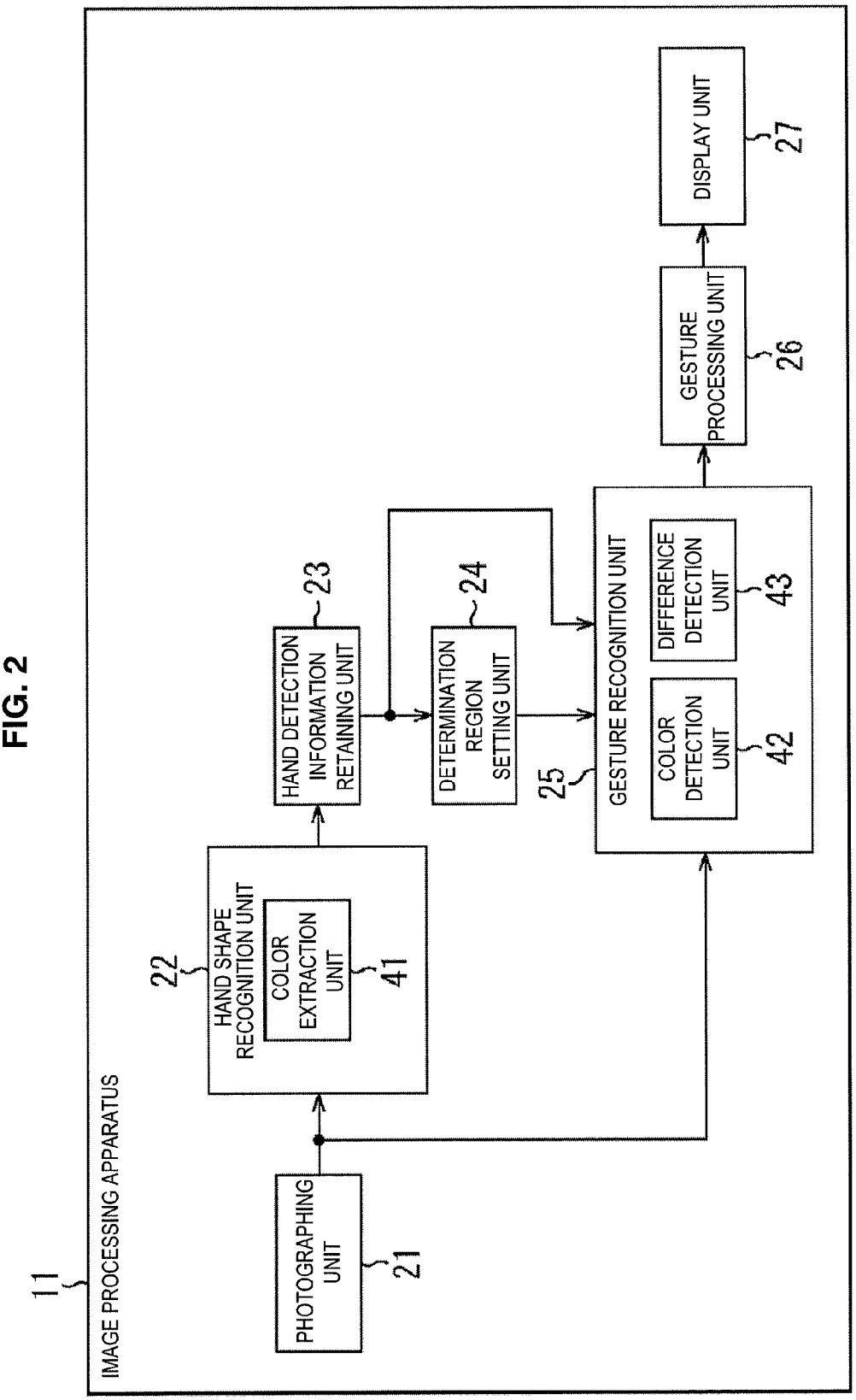
FIG. 2 is a diagram illustrating an example of the configuration of an image processing apparatus.

Hereinafter, embodiments of the present technology will be described with reference to the drawings.

First Embodiment

Overview of Embodiments of the Present Technology

First, the overview of embodiments of the present technology will be described with reference to FIG. 1. According to the embodiments of the present technology, a hand gesture (hereinafter, simply referred to as a gesture) of a user is recognized and a process is performed in response to the recognized gesture.

Hereinafter, cases will be continuously described in which a hand in a so-called paper shape, that is, a hand of which all the fingers are extended, is recognized and then an operation of moving the hand right or left by a user is recognized as a gesture.

In the recognition of a gesture, a hand with a shape determined in advance is detected from an input image obtained by photographing a user's hand through hand shape recognition. Here, for example, as shown in the left part of FIG. 1, a hand in a paper shape H11 is detected.

When the user's hand H11 in a paper shape is detected, determination regions DR11-1 and DR11-2 to be monitored to recognize a gesture performed by the user are determined based on the subsequently detected position and size of the hand H11 of the user.

For example, when the hand H11 of the user is detected, the central position C11 of the hand H11 is obtained. Therefore, a rectangular region centered on a position to the left in the drawing from the central position C11 by only half the width of the hand H11 and having a predetermined size is detected as the determination region DR11-1. Likewise, a rectangular region centered on a position to the right in the drawing from the central position C11 by only half the width of the hand H11 and having a predetermined size is detected as the determination region DR11-2. When it is not necessary to distinguish the determination regions DR11-1 and DR11-2 from each other, the determination regions DR11-1 and DR11-2 are simply referred to as the determination regions DR11 below.

When the user's hand H11 in the paper shape is recognized in this way, the user moves his or her hand right or left in this state. For example, as shown in the right part of the drawing, when the user moves the hand H11 right and the hand H11 reaches (is moved to) the determination region DR11-2, it is recognized that a gesture is performed by the user.

In the embodiments of the present technology, a user's hand with a specific shape is detected and a position in the vicinity of the user's hand is determined as the determination region. When the user's hand reaches the set determination region, it is recognized that a gesture is performed.

In the embodiments of the present technology, since the user's hand with a specific shape is detected through the hand shape recognition, the determination region with a suitable size can be set at a suitable position in accordance with the shape or size of the hand and a gesture to be recognized. Accordingly, since only the determination region may be set as a monitoring target, a gesture can be recognized at high speed and with high accuracy through less processing.

Example of Configuration of Image Processing Apparatus

FIG. 2 is a diagram illustrating an example of the configuration of an image processing apparatus according to an embodiment of the present technology.

An image processing apparatus 11 includes a photographing unit 21, a hand shape recognition unit 22, a hand detection information retaining unit 23, a determination region setting unit 24, a gesture recognition unit 25, a gesture processing unit 26, and a display unit 27.

The photographing unit 21 photographs an image of a user observed around the image processing apparatus 11 as an input image, for example, in the front of the display unit 27 and supplies the input image to the hand shape recognition unit 22 and the gesture recognition unit 25. The hand shape recognition unit 22 recognizes the hand shape recognition based on the input image supplied from the photographing unit 21 to detect a region of the hand with a specific shape from the input image.

The hand shape recognition unit 22 includes a color extraction unit 41. The color extraction unit 41 extracts color information of the region of the hand on the input image based on the result of the hand detection obtained from the input image. The hand shape recognition unit 22 supplies the result of the hand shape recognition and the color information to the hand detection information retaining unit 23.

The hand detection information retaining unit 23 retains the result of the hand shape recognition and the color information supplied from the hand shape recognition unit 22 as the hand detection information and supplies the result of the hand shape recognition and the color information to the determination region setting unit 24 and the gesture recognition unit 25, as necessary. The determination region setting unit 24 sets the determination region based on the hand detection information retained in the hand detection information retaining unit 23 and supplies the determination region to the gesture recognition unit 25.

The gesture recognition unit 25 recognizes a gesture of the user based on the input image from the photographing unit 21, the hand detection information from the hand detection information retaining unit 23, and the determination region from the determination region setting unit 24, and then supplies the recognition result to the gesture processing unit 26.

The gesture recognition unit 25 includes a color detection unit 42 and a difference detection unit 43. The color detection unit 42 detects the gesture of the user by monitoring movement inside the determination region of a color region indicated by the color information on the input image. The difference detection unit 43 detects the gesture of the user by calculating a difference between frames of the input image or monitoring the movement of a moving subject inside the determination region on the input image.

The gesture processing unit 26 performs a process in accordance with the result of the recognition of the gesture supplied from the gesture recognition unit 25 to display an image on the display unit 27, as necessary. The display unit 27 displays the image under the control of the gesture processing unit 26.

For example, the result of the gesture recognition itself may be displayed on the display unit 27, or the channel of a program displayed on the display unit 27 may be changed in accordance with the result of the gesture recognition and the program of the changed channel may be displayed on the display unit 27.

Hand Shape Recognition

The hand shape recognition of the hand shape recognition unit 22 may be any hand shape recognition method, as long as a hand with a specific shape can be recognized based on the input image. Various methods have been known as the hand shape recognition. Hereinafter, description will be made on the assumption that a recognition process using a dictionary obtained by statistical learning and used to recognize a hand with a specific shape is performed as the hand shape recognition.

The dictionary for the hand shape recognition includes the kinds of filters used to recognize a hand with a specific shape and information regarding a feature point for extracting a feature amount using the filters. For example, the dictionary includes information indicating rectangular filters of different angles or differential values as the filters used to recognize a hand with a specific shape.

When the feature amount is extracted by performing a filtering process on each region of the input image based on the dictionary, a score indicating the likeness of a hand with a specific shape can be obtained for each region. Therefore, a region with the highest score equal to or greater than a predetermined threshold value is detected as a region that contains the hand with the specific shape. In the hand shape recognition, the shape of the hand, the size of the hand, and the position of the hand (the region of the hand) recognized on the input image can be obtained as the result of the recognition of the hand with the specific shape.

More specifically, a luminance image indicating the luminance of each position of the input image is generated and a filtering process is performed on the luminance image to extract the feature amount from the input image.

Object recognition is described in detail in, for example, the following documents.

Document 1 "Vector Boosting for Rotation Invariant Multi-View Face Detection," C. Huang, H. Z. Ai, Y. Li, and S. H. Lao, Proc. 10th IEEE Int'l Conf. Computer Vision, 2005

Document 2 "A detector tree of boosted classifiers for real-time object detection and tracking," R. Lienhart, L. Liang, A. Kuranov, Proceedings of the 2003 International Conference on Multimedia and Expo-Volume 1

Document 3 "Multi-view face pose classification by tree-structured classifier," Zhiguang Yang; Haizhou Ai; Okamoto, T. Shihong Lao; Image Processing, 2005. ICIP 2005. IEEE International Conference on Volume 2, 11-14 Sep. 2005 Page(s): II-358-61

Document 4 "A boosted classifier tree for hand shape detection," E J Ong, R Bowden, Face and Gesture Recognition, 2004

Document 5 "Cluster Boosted Tree Classifier for Multi-View, Multi-Pose Object Detection," Bo Wu; Nevatia, R. ICCV 2007. IEEE 11th International Conference on Computer Vision, 14 to 21 Oct. 2007 Page(s): 18

Document 6 "Sharing visual features for multiclass and multi-view object detection," A. Torralba, K. P. Murphy and W. T. Freeman, IEEE Transactions on Pattern Analysis and Machine Intelligence, vol. 29, no. 5, pp. 854 to 869, May, 2007

Document 7 "Fast Multi-View Face Detection," M. Jones and P. Viola, MERLTR 2003-96, July 2003

Description of Gesture Recognition Process

When the image processing apparatus 11 receives an instruction to perform a process in response to a gesture from the user, the image processing apparatus 11 starts a gesture recognition process to recognize the gesture and performs a process in response to the recognized gesture. Hereinafter, the gesture recognition process of the image processing apparatus 11 will be described with reference to the flowchart of FIG. 3.

In step S11, the photographing unit 21 starts photographing an input image in which a user is a subject and supplies the input image of each frame obtained through the photographing to the hand shape recognition unit 22 and the gesture recognition unit 25 in sequence.

In step S12, the hand shape recognition unit 22 performs hand shape recognition based on the input image supplied from the photographing unit 21. For example, the hand shape recognition unit 22 extracts a feature amount from the input image using the dictionary recorded in advance and used to recognize a hand in a paper shape, and detects the region of the hand in the paper shape from the input image.

In step S13, the hand shape recognition unit 22 determines whether the hand with a specific shape is detected from the input image of the frame to be processed. When it is determined in step S13 that the hand with a specific shape is not detected, in step S14, the hand shape recognition unit 22 determines whether the hand has already been detected.

For example, when the hand with the specific shape has been detected from the input image of the previous frame of the frame to be processed and the hand detection information is retained beforehand in the hand detection information retaining unit 23, it is determined that the hand with the specific shape has already been detected.

When it is determined in step S14 that the hand with the specific shape has not been detected once, that is, it is determined that the hand with the specific shape has not been detected once from the input image, the process returns to step S12 and the above-described processes are repeated.

Conversely, when it is determined in step S14 that the hand with the specific shape has already been detected, the hand detection information is retained beforehand in the hand detection information retaining unit 23, and thus the gesture can be recognized. Then, the process proceeds to step S17.

When it is determined in step S13 that the hand with a specific shape is detected, the hand detection information retaining unit 23 retains the hand detection information in step S15.

That is, when the hand with the specific shape is detected through the hand shape recognition, information regarding the recognized shape, size, and position of the hand can be obtained as the result of the hand shape recognition. Thus, since the region of the hand on the input image can be approximately known from this information, the color extraction unit 41 extracts the color of the approximately central region of the hand in the region of the hand on the input image as the color of the detected user's hand and generates color information indicating the color of the detected user's hand.

The hand shape recognition unit 22 supplies the information regarding the obtained shape, size, and position of the hand and the color information as the hand detection information to the hand detection information retaining unit 23. The hand detection information retaining unit 23 retains the hand detection information supplied from the hand shape recognition unit 22.

When the shape of the user's hand and the region of the hand are known in advance by detecting a skin color region on the input image or performing a designation operation by the user, the process of step S15 may be performed without performing the processes of step S12 and step S13 after the start of the photographing of the input image, so that the hand detection information may be retained.

In step S16, the determination region setting unit 24 determines the determination region based on the hand detection information retained in the hand detection information retaining unit 23.

For example, it is assumed that the hand in a paper shape is recognized through the hand shape recognition and the gesture described with reference to FIG. 1 is a gesture to be recognized. Further, it is assumed that the right direction is a +x direction and the upper direction is a +y direction in FIG. 1, and the central position C11 of the hand H11 and the width and height of the hand H11 in the xy coordinate system are retained as the hand detection information.

For example, here, it is assumed that the central position C11 is coordinates (Cx, Cy). Further, it is assumed that Hw is the width of the hand H11, that is, the length of the hand H11 in the x direction and Hh is the height of the hand H11, that is, the length of the hand H11 in the y direction. In this example, the coordinates (Cx, Cy) of the central position C11 are information regarding the position of the hand included in the hand detection information. The width Hw and the height Hh of the hand H11 are information regarding the size of the hand included in the hand detection information.

In this case, based on the hand detection information, the determination region setting unit 24 calculates the coordinates (SLx, SLy) of the left lower vertex SL of a rectangular region, which is the determination region DR11-1, in the xy coordinate system. For example, the relation of "(SLx, SLy)=(Cx−Hw/α, Cy−Hh/β)" is satisfied. Here, α and β are integers.

The determination region setting unit 24 calculates the coordinates (ELx, ELy) of the right upper vertex EL of the rectangular region, which is the determination region DR11-1, in the xy coordinate system. For example, the relation of "(ELx, ELy)=(SLx+γ, SLy+γ)," where γ is an integer, is satisfied. Thus, the determination region DR11-1 is specified by the determined vertexes SL and EL.

Likewise, based on the hand detection information, the determination region setting unit 24 calculates the coordinates (SRx, SRy) of the left lower vertex SR and coordinates (ERx, ERy) of the right upper vertex ER of a rectangular region, which is the determination region DR11-2. For example, the relation of "(SRx, SRy)=(Cx−Hw/α, Cy−Hh/β)" is satisfied and the relation of "(ERx, ERy)=(SRx+γ, SRy+γ)" is satisfied.

The integers α and β used to determine the position of the determination region DR11 or the integer γ used to determine the size of the determination region DR11 are set arbitrarily in accordance with the gesture to be recognized. In general, the region in the vicinity of the recognized hand is determined as the determination region so that the recognition of the hand gesture is performed simply and reliably.

For example, in the example of FIG. 1, the gesture to be recognized is a gesture of moving the hand H11 right or left in the drawing by the user after the hand in the paper shape is recognized.

Accordingly, in this example, each determination region DR11 is set at a position in the right or left direction of the hand H11 by only a distance determined by the size (width) of the hand H11.

The determination region DR11-1 is a monitoring region used to recognize the gesture of moving the hand H11 left in FIG. 1 by the user. The determination region DR11-2 is a monitoring region used to recognize the gesture of moving the hand H11 right in FIG. 1 by the user. When one of the two gestures is recognized, the same process may be performed in response to the gestures or different processes may be performed depending on the directions of the gestures.

When the shape, position, size, or the like of the hand is specified through the hand shape recognition, the determination regions DR11 can be suitably determined in response to the gesture to be recognized. Thus, since a monitoring region of the input image in the gesture recognition can be made smaller, the gesture can be recognized at high speed and with thigh accuracy by simpler processing.

Further, the integers α, β, and γ used to determine the determination regions DR11 may be set by the user, since suitable hand search ranges may be different depending on the use purpose of the gestures or the like. The determination regions are determined based on the position or size of the hand so that the determination regions are in the vicinity of the region of the hand. However, when the use situation of the gesture is clear, the determination regions may be designated at any positions.

Figure 3:
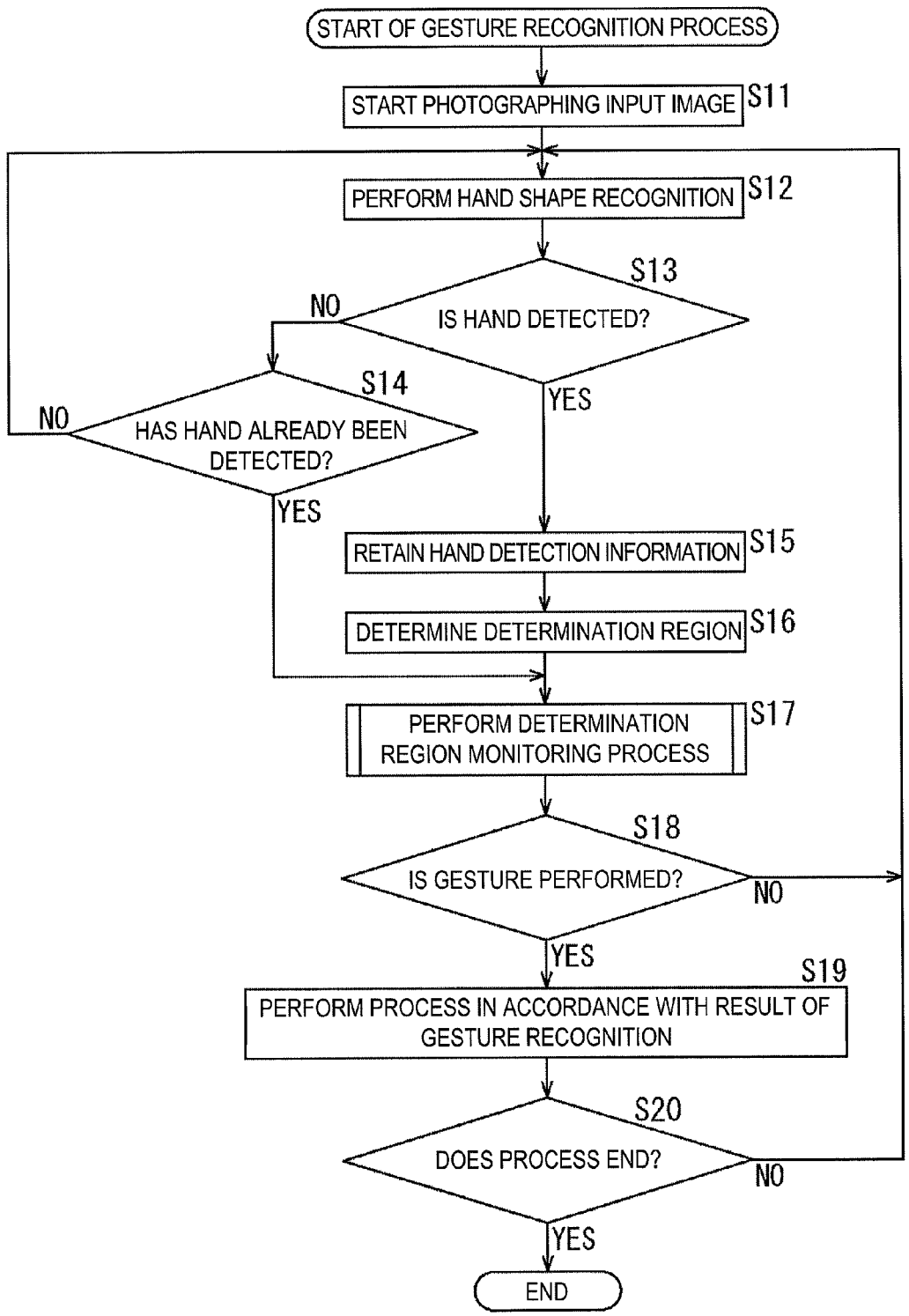
FIG. 3 is a flowchart illustrating a gesture recognition process.

Referring back to the flowchart of FIG. 3, when the determination regions are determined, the determination region setting unit 24 supplies the determination regions to the gesture recognition unit 25 and the process proceeds from step S16 to step S17.

In step S17, the gesture recognition unit 25 performs a determination region monitoring process based on the determination regions from the determination region setting unit 24 and the input image from the photographing unit 21, referring to the hand detection information retained in the hand detection information retaining unit 23, as necessary.

Hereinafter, the determination region monitoring process of the gesture recognition unit 25 will be described with reference to the flowchart of FIG. 4.

In step S51, the color detection unit 42 specifies the color of each region inside the determination region of the input image, which is supplied from the photographing unit 21, to be processed. In step S52, the color detection unit 42 compares the color of the determination region with the color of the user's hand indicated by the color information included in the hand detection information. That is, when the color of the determination region is the same as the color of the user's hand, it can be known that the user's hand is moved to the inside of the determination region and a gesture is performed.

In step S53, the difference detection unit 43 calculates a difference between the input image of a frame, which is supplied from the photographing unit 21, to be processed and, for example, the input image of the frame immediately previous to the frame to be processed. Specifically, the difference detection unit 43 calculates the difference absolute value between the pixel values of pixels located at the same position of the frames of the input image.

In step S54, the difference detection unit 43 specifies a difference region on the input image based on the difference between the frames of the input images. Here, the difference region refers to a region in which the difference absolute value between the frames calculated in the process of step S53 is equal to or greater than a predetermined threshold value and which is formed by pixels adjacent to each other. Since a region with a large difference absolute value between the frames is a region at which a subject (moving subject) is moving, there is a high possibility that the moving subject is the user's hand.

Therefore, the difference detection unit 43 recognizes a gesture of the user by detecting the region of the moving subject on the input image as the difference region and monitoring whether the determination region contains the inside of the difference region. That is, when the user's hand is moved, the region of the hand becomes the difference region. Therefore, when the difference region reaches the determination region, the user's hand is moved to the inside of the determination region, and thus it can be known that the gesture is performed.

When it is detected whether the user's hand is moved to the determination region based on the color of the user's hand and the difference information of the input image, the determination region monitoring process ends, and then the process proceeds to step S18 in FIG. 3.

In step S18, the gesture recognition unit 25 determines whether the gesture is performed by the user based on the result obtained by comparing the color indicated by the color information with the color of the determination region and the result obtained by specifying the difference region.

For example, it is determined that the gesture is performed by the user, when the color of the determination region is the color of the user's hand indicated by the color information and a part or the entirety of the determination region is contained in the inside of the difference region.

Further, it may be determined that the gesture is performed by the user, at least when the color of the determination region is the color of the user's hand indicated by the color information or when a part or the entirety of the determination region is contained in the inside of the difference region.

When it is determined in step S18 that the gesture is not performed, the process returns to step S12 and the above-described processes are repeated. That is, the subsequent frame is set as a frame to be processed, and the hand shape recognition and the gesture recognition are performed on the input image of the frame to be newly processed.

When the user's hand is being moved, the shape of the user's hand is changed. Therefore, the hand with a specific shape (for example, a paper shape) is not detected from the input image and the hand detection information is not updated. Conversely, when the user holds the hand with a specific shape in the front of the photographing unit 21 so that the shape of the hand is recognized, the hand is detected through the hand shape recognition, the hand detection information is updated, and thus a new determination region is set.

When it is determined in step S18 that the gesture is performed, the gesture recognition unit 25 supplies the result of the gesture recognition to the gesture processing unit 26, and then the process proceeds to step S19. For example, the gesture recognition unit 25 supplies the gesture processing unit 26 with the result of the gesture recognition indicating that the gesture of moving the user's hand from the state of the paper shape to the determination region DR11-1 in FIG. 1 is performed.

In step S19, the gesture processing unit 26 performs a process in accordance with the result of the gesture recognition from the gesture recognition unit 25. For example, the gesture processing unit 26 supplies an image indicating the result of the gesture recognition to display the image on the display unit 27 or changes the channel of a program displayed on the display unit 27 in accordance with the gesture.

In step S20, the image processing apparatus 11 determines whether the gesture recognition process ends. For example, when an instruction to end the process performed in response to the gesture recognition is given by the user, it is determined that the gesture recognition process ends.

When it is determined in step S20 that the gesture recognition process has not ended, the process returns to step S12 and the above-described processes are repeated. That is, a new gesture is recognized.

On the other hand, when the image processing apparatus 11 determines that that the gesture recognition process ends in step S20, the image processing apparatus 11 stops the process of each unit and ends the gesture recognition process.

Thus, the image processing apparatus 11 recognizes a gesture of the user by detecting a hand with a specific shape from the input image, setting the determination region based on the detection result, and recognizing the gesture of the user.

Since a suitable determination region can be determined for each gesture by setting the determination region based on the result of the hand shape detection, the gesture can be recognized at high speed and with high accuracy. Further, a gesture can be recognized at stable speed irrespective of the resolution of the input image.

Whenever the hand is recognized, the color of the user's hand is extracted and the color information is retained as the hand detection information. Further, when the gesture is recognized, only the vicinity of the region of the hand is considered as a monitoring target. Accordingly, even when an illumination condition is changed and the color of the user's hand on the input image is changed or even when there is a subject with a color similar to the color of the hand against the input image, the region of the hand can be specified with high accuracy. Accordingly, the recognition accuracy of the gesture can be further improved.

Since the gesture is recognized by monitoring the determination region set based on the detection result after the detection of a hand with a specific shape, the gesture can be recognized irrespective of the shape of the user's hand. That is, since it is not necessary for the user to perform a gesture with maintaining a shape of the hand, the user can perform an input operation with a simple gesture.

First Modified Example

Description of Gesture Recognition Process

The case in which in the gesture recognition process, the hand shape recognition and the gesture recognition continue normally after the input image starts to be photographed has been described above. However, only the gesture recognition may continue for a given period after the hand is detected through the hand shape recognition. That is, when the hand is detected through the hand shape recognition, and then when only the gesture recognition continues until the recognition of the gesture and no gesture is recognized even after a given period, the hand shape recognition is performed again.

Figure 5:
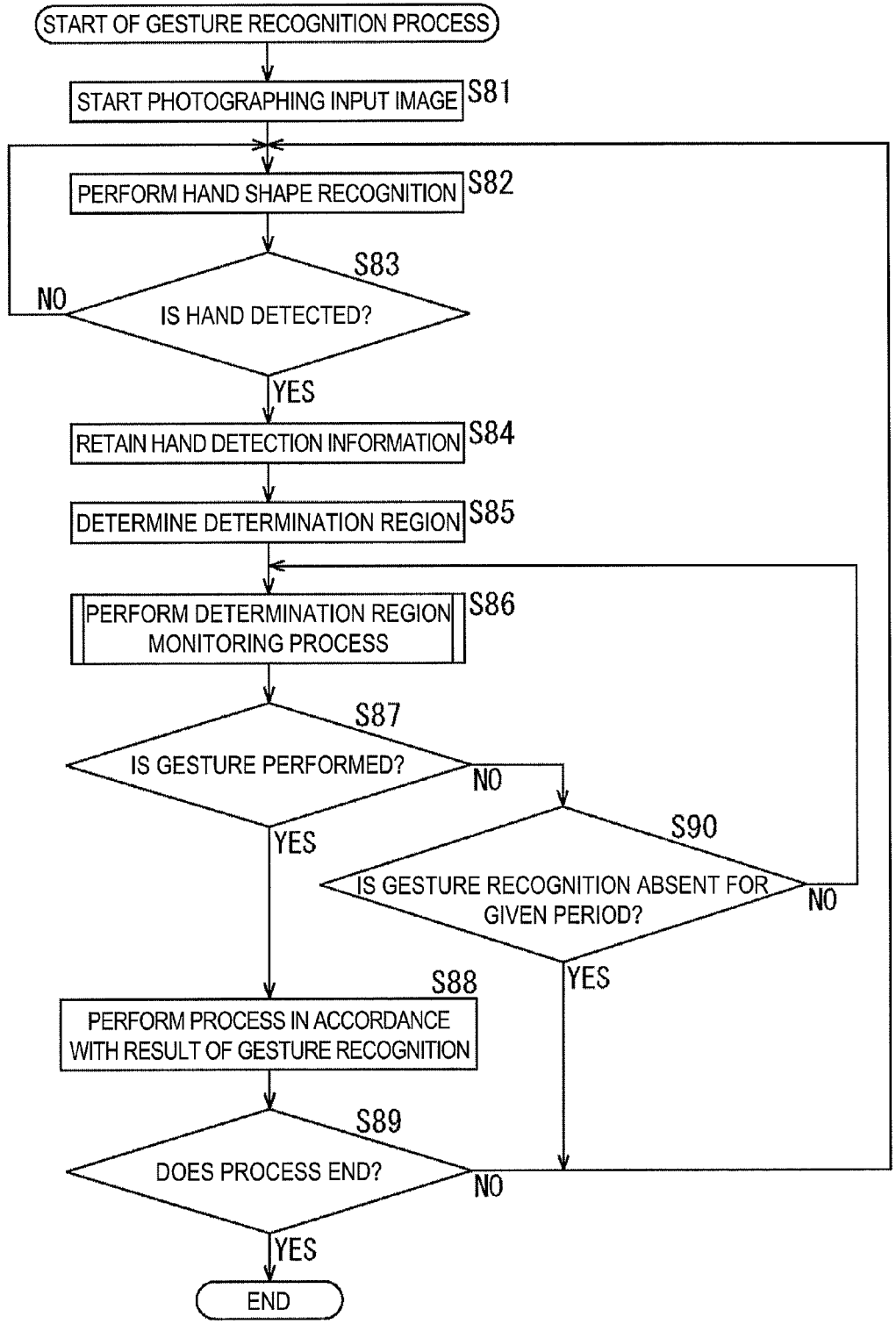
FIG. 5 is a flowchart illustrating a gesture recognition process.

In this case, the image processing apparatus 11 performs the gesture recognition process shown in FIG. 5. Hereinafter, a gesture recognition process of the image processing apparatus 11 will be described with reference to the flowchart of FIG. 5.

Since the processes of step S81 and step S82 are the same as those of step S11 and step S12 in FIG. 3, the description thereof will not be repeated.

In step S83, the hand shape recognition unit 22 determines whether a hand with a specific shape is detected from an input image of a frame to be processed. When it is determined in step S83 that the hand with the specific shape is not detected, the process returns to step S82 and the above-described processes are repeated. That is, the hand shape recognition is repeated until the hand with the specific shape is detected.

On the other hand, when it is determined in step S83 that the hand with the specific shape is detected, the processes of step S84 to step S87 are performed. Since the processes of step S84 to step S87 are the same as those of step S15 to S18 in FIG. 3, the description thereof will not be repeated.

When it is determined in step S87 that no gesture is performed, the gesture recognition unit 25 determines whether the hand with the specific shape is recognized through the hand shape recognition and no gesture is recognized for a given period in step S90.

When it is determined in step S90 that no gesture is recognized for the given period, the process returns to step S82 and the above-described processes are repeated. That is, the hand shape recognition is newly performed and the gesture recognition is performed based on information obtained as the result of the new hand shape recognition.

On the other hand, when it is determined in step S90 that no gesture is recognized for the given period, that is, a given period does not elapse after the start of the gesture recognition, the process returns to step S86 and the above-described processes are repeated. That is, the gesture recognition continues.

When it is determined in step S87 that a gesture is performed, the processes of step S88 and step S89 are performed and the gesture recognition process ends. Since the processes of step S88 and step S89 are the same as those of step S19 and step S20 in FIG. 3, the description thereof will not be repeated.

Thus, the image processing apparatus 11 detects the hand with the specific shape from the input image and recognizes the gesture of the user based on the detection result.

Second Embodiment

Example of Configuration of Image Processing Apparatus

Figure 6:
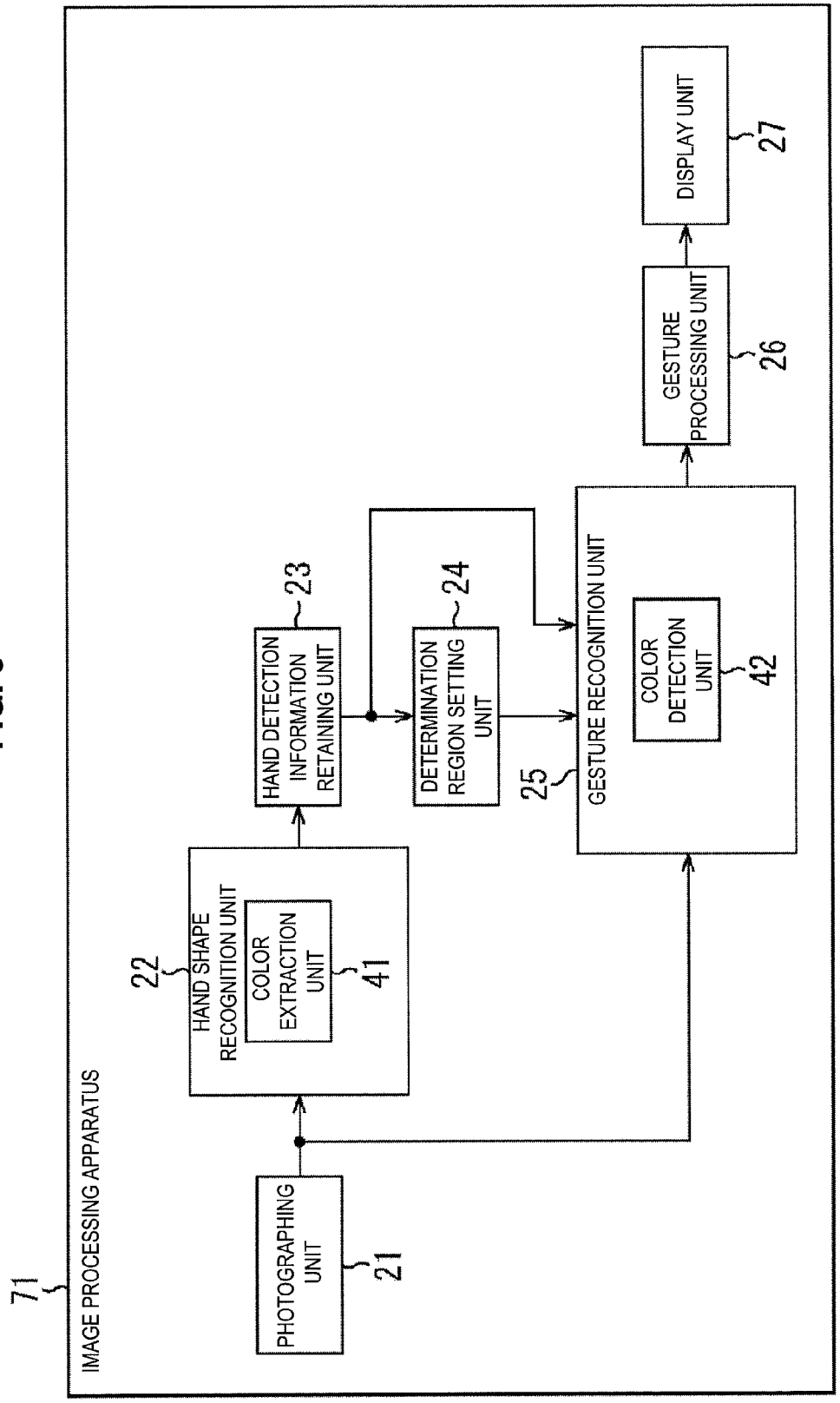
FIG. 6 is a diagram illustrating another example of the configuration of an image processing apparatus.

The case in which the gesture recognition is performed based on the color of the user's hand and the difference information of the input image has been described above. However, the gesture recognition may be performed based on only the color of the user's hand. In this case, an image processing apparatus has a configuration shown in FIG. 6. In FIG. 6, the same reference numerals are given to units corresponding to the units in FIG. 2, and the description thereof will not be repeated.

An image processing apparatus 71 in FIG. 6 includes a photographing unit 21 to a display unit 27. The configuration of the image processing apparatus 71 is different from that of the image processing apparatus 11 in that the gesture recognition unit 25 does not include the difference detection unit 43. The remaining configuration of the image processing apparatus 71 is the same as that of the image processing apparatus 11.

Description of Determination Region Monitoring Process

The image processing apparatus 71 also performs the same process as the gesture recognition process described with reference to FIG. 3. However, in the determination region monitoring process of step S17, it is monitored whether the region of the color of the user's hand is moved to the determination region.

Figure 7:
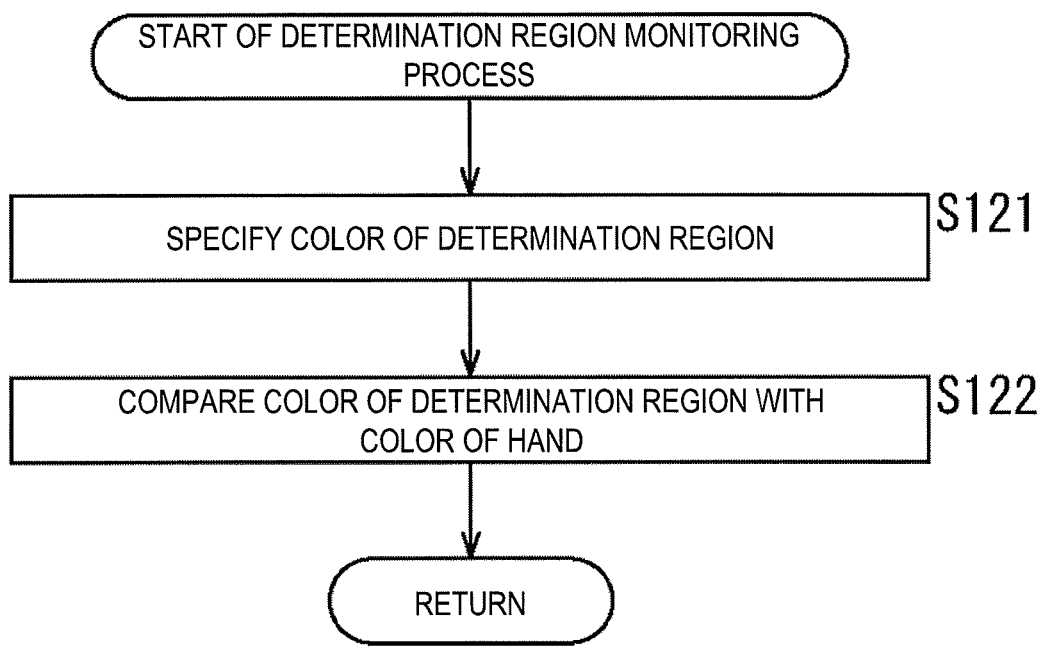
FIG. 7 is a flowchart illustrating a determination region monitoring process.

Hereinafter, a determination region monitoring process corresponding to the gesture recognition process and performed by the image processing apparatus 71 in step S17 in FIG. 3 will be described with reference to the flowchart of FIG. 7.

In step S121, the color detection unit 42 specifies the color of each region inside the determination region of the input image, which is supplied from the photographing unit 21, to be processed. In step S122, the color detection unit 42 compares the color of the determination region with the color of the user's hand indicated by the color information included in the hand detection information. That is, when the color of the determination region is the same as the color of the user's hand, it can be known that the user's hand is moved to the inside of the determination region and a gesture is performed. The processes of step S121 and step S122 are the same as the processes of step S51 and step S52 in FIG. 4.

When the color of the determination region is compared with the color of the user's hand in the process of step S122, the determination region monitoring process ends, and then the process proceeds to step S18 in FIG. 3. Then, the processes of step S18 to step S20 are performed and the gesture recognition process ends. However, when it is determined in step S18 that the color of the determination region is the color of the user's hand indicated by the color information, it is determined that the gesture is performed by the user.

Further, the image processing apparatus 71 may perform the gesture recognition process described with reference to FIG. 5. In this case, the processes which are basically the same as the processes of step S81 to step S90 in the image processing apparatus 11 are performed. However, in step S86, the determination region monitoring process described with reference to FIG. 7 is performed. In step S87, it is determined that the gesture is performed by the user when the color of the determination region is the color of the user's hand indicated by the color information.

Third Embodiment

Example of Configuration of Image Processing Apparatus

Figure 8:
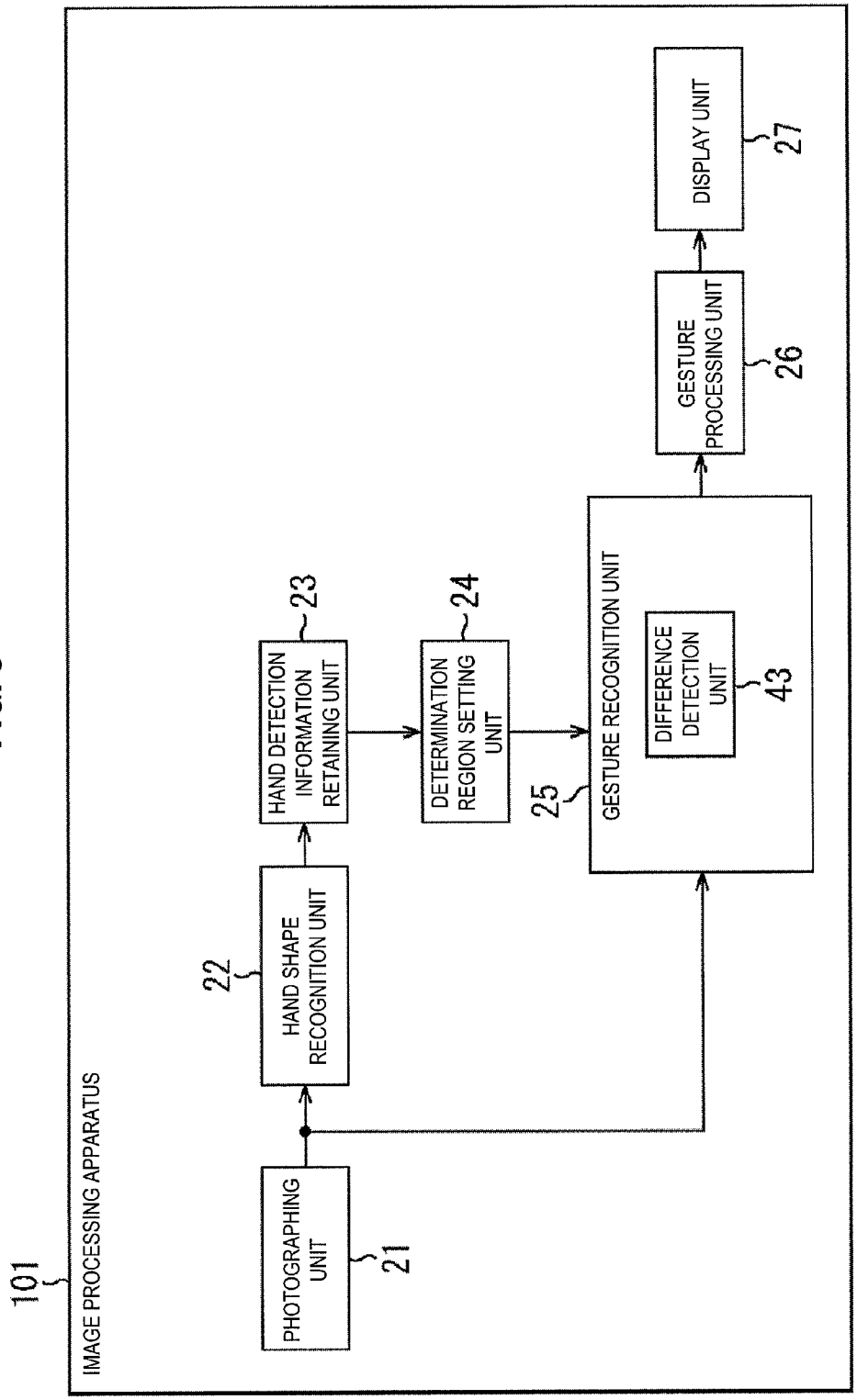
FIG. 8 is a diagram illustrating still another example of the configuration of an image processing apparatus.

Only the difference information of the input image may be used when a gesture is recognized. In this case, an image processing apparatus has a configuration shown in FIG. 8. In FIG. 8, the same reference numerals are given to units corresponding to the units in FIG. 2, and the description thereof will not be repeated.

An image processing apparatus 101 in FIG. 8 includes a photographing unit 21 to a display unit 27. The configuration of the image processing apparatus 101 is different from that of the image processing apparatus 11 in that the hand shape recognition unit 22 does not include the color extraction unit 41 and the gesture recognition unit 25 does not include the color detection unit 42. The remaining configuration of the image processing apparatus 101 is the same as that of the image processing apparatus 11.

In the image processing apparatus 101, the hand detection information retained in the hand detection information retaining unit 23 includes no color information and the hand detection information is not supplied to the gesture recognition unit 25.

Description of Determination Region Monitoring Process

The image processing apparatus 101 performs the same process as the gesture recognition process described with reference to FIG. 3. However, in step S15, the information regarding the shape, size, and position of the hand obtained as the result of the hand shape recognition is retained as the hand detection information in the hand detection information retaining unit 23.

In the determination region monitoring process of step S17, it is monitored that the region of the user's is moved to the determination region based on the difference information of the input image.

Figure 9:
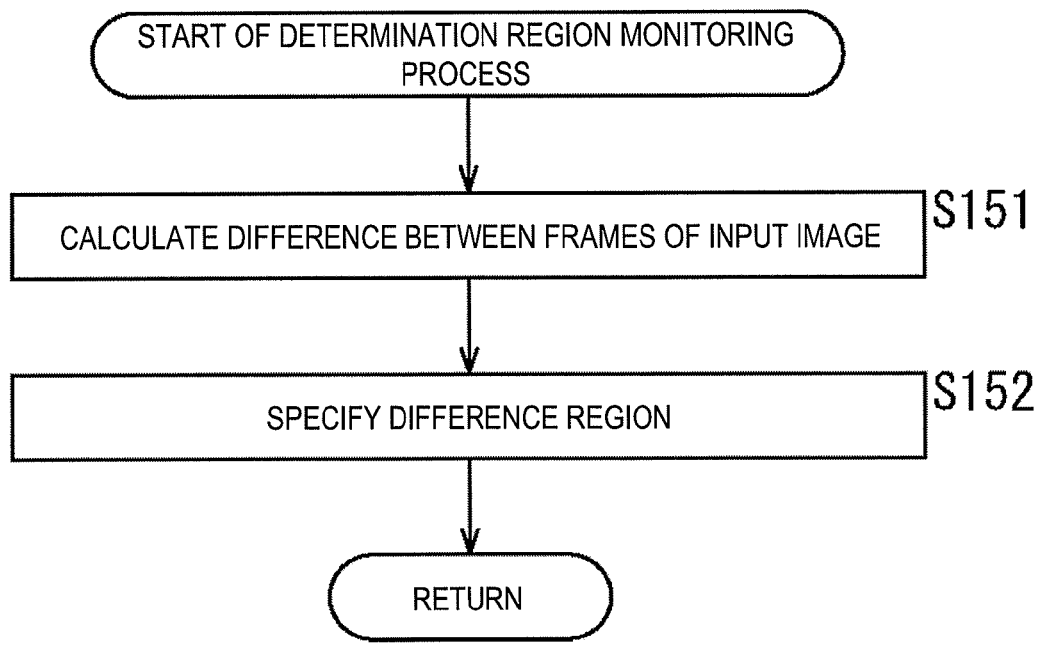
FIG. 9 is a flowchart illustrating a determination region monitoring process.

Hereinafter, a determination region monitoring process corresponding to the gesture recognition process and performed by the image processing apparatus 101 in step S17 in FIG. 3 will be described with reference to the flowchart of FIG. 9.

In step S151, the difference detection unit 43 calculates a difference between the frame of the input image, which is supplied from the photographing unit 21, to be processed and the frame of the input image previous to the frame to be processed. In step S152, the difference detection unit 43 specifies the difference region on the input image based on the difference between the frames of the input image. The processes of step S151 and step S152 are the same as the processes of step S53 and step S54 in FIG. 4.

When the difference region on the input image is specified in the process of step S152, the determination region monitoring process ends, and then the process proceeds to step S18 in FIG. 3. Then, the processes of step S18 to step S20 are performed and the gesture recognition process ends. However, in step S18, when a part or the entirety of the determination region is contained in the difference region, it is determined that the gesture is performed by the user.

Further, the image processing apparatus 101 may perform the gesture recognition process described with reference to FIG. 5. In this case, the processes which are basically the same as the processes of step S81 to step S90 in the image processing apparatus 11 are performed.

However, in step S84, the hand detection information is generated only from the result of the hand shape recognition. In step S86, the determination region monitoring process described with reference to FIG. 9 is performed. In step S87, when a part or the entirety of the determination region is contained in the difference region, it is determined that the gesture is performed by the user.

Fourth Embodiment

Gesture to be Recognized

The case in which one hand with a specific shape is recognized, and then a gesture is performed has been described above. However, when a gesture is started, the shapes of a hand to be recognized by the image processing apparatus may be different depending on the gesture. Thus, since more gestures can be recognized, various gesture operations can be realized.

Figure 10:
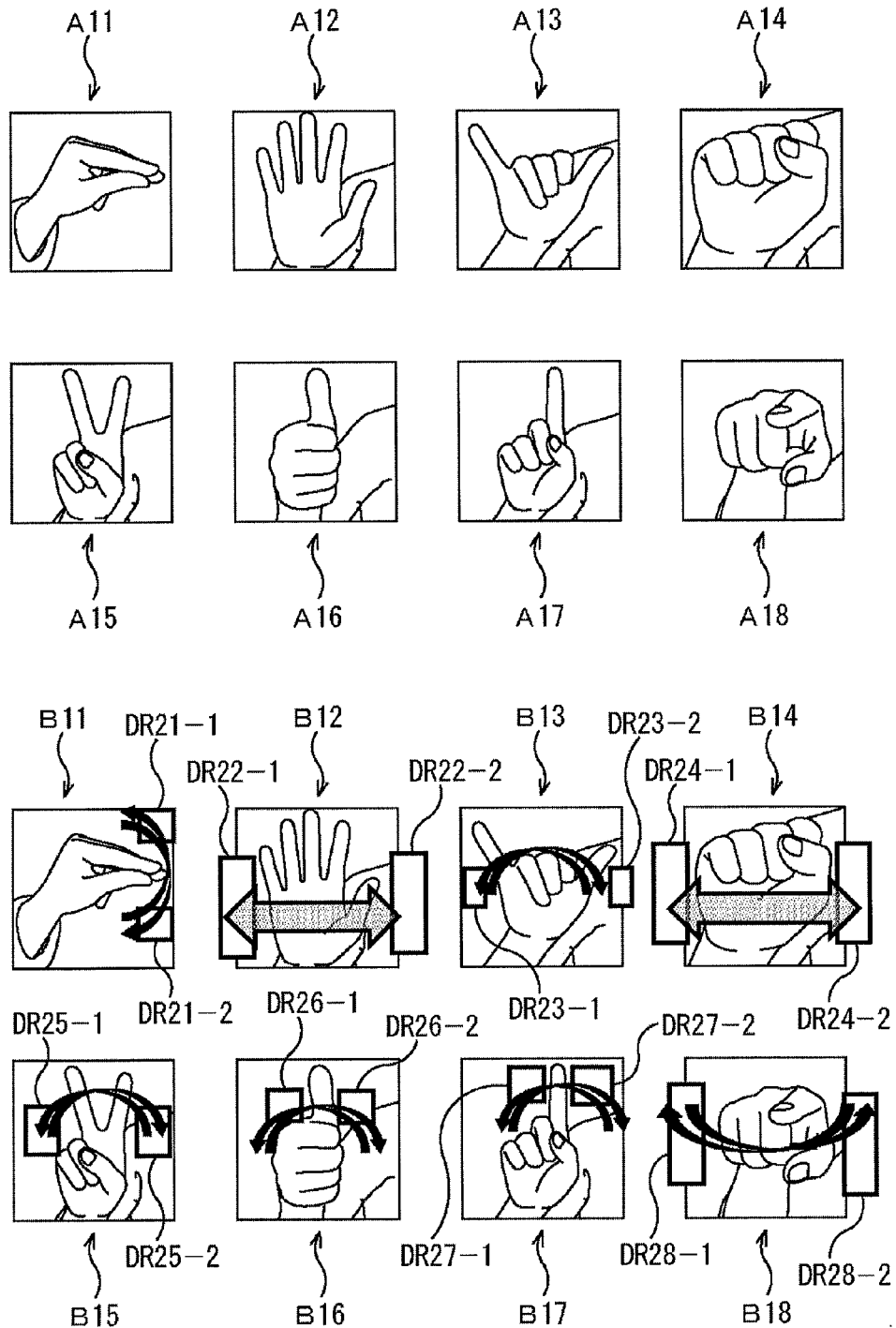
FIG. 10 is a diagram illustrating hand shapes and gestures.

In this case, for example, hand shapes shown in the upper part of FIG. 10 can be considered to be detected and gestures shown in the lower part of FIG. 10 can be considered gestures to be recognized. In FIG. 10, arrows A11 to A18 indicate the hand shapes to be detected and arrows B11 to B18 indicate gestures of the hand shapes indicated by the arrows A11 to A18.

For example, the hand shape indicated by the arrow A11 is a hand shape (hereinafter, also referred to a grip shape) in which an object is held with the thumb and the other fingers in a horizontal direction in the front of a photographing unit of a camera. In this case, the user makes the grip shape indicated by the arrow A11 with his or her hand, and then performs a gesture of holding an object and releasing the object while moving the thumb and the other fingers vertically in the drawing, as indicated by the arrow B11.

In this gesture, determination regions DR21-1 and DR21-2 are determined at positions only by a predetermined distance away vertically from the fingertips of the thumb and the index finger of the hand with the grip shape. Here, the approximate positions of the thumb and the index finger of the hand with the grip shape can be specified as the result of the hand shape recognition. For example, the distances between the fingertips and the determination regions DR21-1 and DR21-2 are determined by, for example, the vertical length (height) of the hand.

The hand shape indicated by the arrow A12 is a paper shape as in the example of FIG. 1. In this case, the user makes a paper shape with his or her hand, and then performs a gesture of moving the hand left or right, as indicated by the arrow B12. In this gesture, determination regions DR22-1 and DR22-2 are determined at positions right and left from the center of the palm of the hand by only a predetermined distance.

Hereinafter, the description will be made on the assumption that the approximate position of each part of the hand with the recognized specific shape can be specified by the result of the hand shape recognition.

For example, when the hand in a paper shape is recognized through the hand shape recognition, the central position of the palm of the hand and the candidate positions (hereinafter, fingertip candidate positions) of the fingertips are determined based on the contour of the region of the hand and the approximate positions of the fingertips are specified based on the inclination of each line segment between the central position and each of the fingertip candidate positions. That is, the reliability of the fingertip candidate position can be obtained from the angle of the contour of the fingertip determined based on the central position and the fingertip candidate position. Thus, based on the result of the hand shape recognition, the approximate position of a desired part of the hand with each shape can be specified.

The hand shape indicated by the arrow A13 is a hand shape in which the thumb and the little finger are extended from a rock shape. In this case, the user makes the shape indicated by the arrow A13 with his or her hand, and then performs a gesture of rotating the wrist about a longitudinal line as a rotation axis in the drawing, as indicated by the arrow B13.

In this gesture, determination regions DR23-1 and DR23-2 are determined at positions only a predetermined distance downward from the little finger and the thumb in the drawing. For example, the positions of the determination regions DR23-1 and DR23-2 are determined based on the central position of the hand and the positions of the fingertips of the thumb and the little finger. In this example, for example, when one or both of the little finger and the thumb are moved to the determination region DR23-1 or DR23-2, it is determined that the gesture is performed.

The hand shape indicated by the arrow A14 is a rock shape. In this case, the user makes a rock shape with his or her hand, and then performs a gesture of moving the hand right or left, as indicated by the arrow B14. In this gesture, determination regions DR24-1 and DR24-2 are determined at positions right and left from the center of the hand by only a predetermined distance. The distance between the center of the hand to the determination region DR24-1 or DR24-2 is determined by the length (width) of the hand in the horizontal direction.

The hand shape indicated by the arrow A15 is a scissors shape, that is, a hand shape in which the index finger and the middle finger are extended and the other fingers are retracted. In this case, the user makes the scissors shape his or her hand, and then performs a gesture of rotating the wrist right and left about a line of a depth direction as a rotation axis in the drawing, as indicated by the arrow B15.

In this gesture, determination regions DR25-1 and DR25-2 are determined at positions only a predetermined distance away from the index finger and the middle finger in an inclined downward direction from the index finger and the middle finger in the drawing. For example, the positions of the determination regions DR25-1 and DR25-2 are determined based on the central position of the hand and the positions of the fingertips of the index finger and the middle finger. In this example, when one or both of the index finger and the middle finger are moved to the determination region DR25-1 or DR25-2, it is determined that the gesture is performed.

The hand shape indicated by the arrow A16 is a so-called thumbs-up hand shape in which the thumb is extended vertically from a rock shape. In this case, the user makes the hand shape indicated by the arrow A16 with his or her hand, and then performs a gesture of rotating the wrist right and left about a line of a depth direction as a rotation axis in the drawing, as indicated by the arrow B16.

In this gesture, determination regions DR26-1 and DR26-2 are determined at positions only a predetermined distance right and left from the thumb in an inclined downward direction of the fingertip of the thumb in the drawing. For example, the positions of the determination regions DR26-1 and DR26-2 are determined based on the central position of the hand and the position of the fingertip of the thumb. In this example, when the thumb is moved to one or both of the determination regions DR26-1 and DR26-2, it is determined that the gesture is performed.

The hand shape indicated by the arrow A17 is a so-called finger-pointing hand shape in which the index finger is extended from a rock shape. In this case, the user makes the hand shape indicated by the arrow A17 with his or her hand, and then performs a gesture of rotating the wrist right and left about a line of a depth direction as a rotation axis in the drawing, as indicated by the arrow B17.

In this gesture, determination regions DR27-1 and DR27-2 are determined at positions in the right and left directions of the fingertip of the index finger by only a predetermined distance from the index finger. For example, the positions of the determination regions DR27-1 and DR27-2 are determined based on the position of the fingertip of the index finger and the height or width of the hand. In this example, for example, when the index finger is moved to one or both of the determination regions DR27-1 and DR27-2, it is determined that the gesture is performed.

The hand shape indicated by the arrow A18 is a finger-pointing hand shape in which the index finger is extended from a rock shape and the index finger points in the forward direction in the drawing. In this case, the user makes the hand shape indicated by the arrow A18 with his or her hand, and then performs a gesture of moving the hand right or left, as indicated by the arrow B18. In this gesture, determination regions DR28-1 and DR28-2 are determined at positions distant right and left from the central position of the hand by only a predetermined distance. The distance between the central position of the hand and the determination region DR28-1 or DR28-2 is determined by the length (width) of the hand in the horizontal direction.

Figure 11:
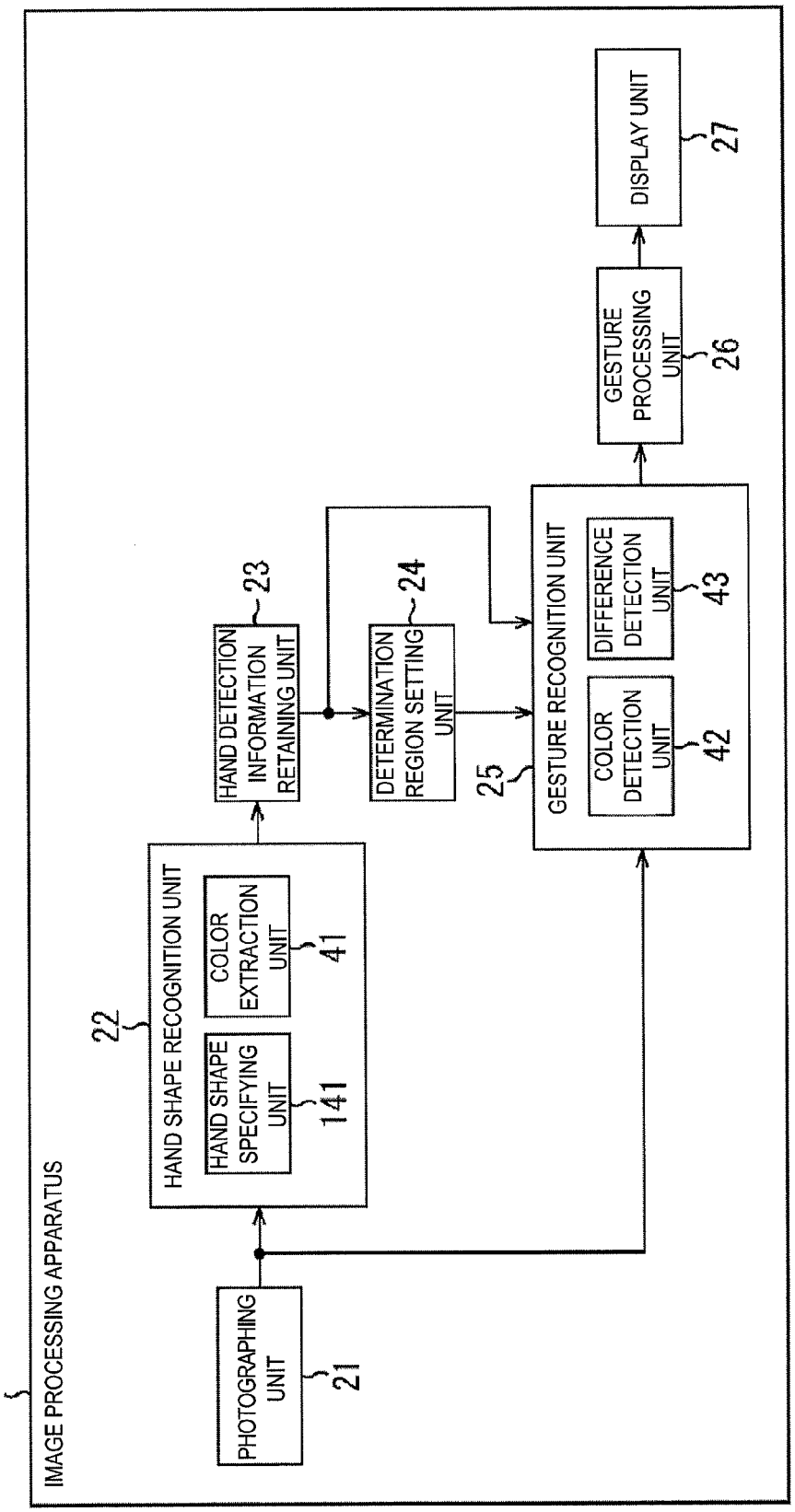
FIG. 11 is a diagram illustrating still another example of the configuration of an image processing apparatus.

A gesture performed by the user is not limited to the examples shown in FIG. 10, but may be any gesture.
Example of Configuration of Image Processing Apparatus When the user performs the plurality of gestures, as in FIG. 10, and a process is performed in accordance with the result of the gesture recognition, an image processing apparatus has a configuration shown in, for example, FIG. 11. In FIG. 11, the same reference numerals are given to units corresponding to the units in FIG. 2, and the description thereof will not be repeated.

An image processing apparatus 131 in FIG. 11 includes a photographing unit 21 to a display unit 27. The configuration of the image processing apparatus 131 is different from that of the image processing apparatus 11 in that the hand shape recognition unit 22 further includes a hand shape specifying unit 141. The remaining configuration of the image processing apparatus 131 is the same as that of the image processing apparatus 11.

A dictionary used to recognize the hand shapes is recorded for each of the plurality of hand shapes shown in, for example, FIG. 10 in the hand shape recognition unit 22. The hand shape recognition unit 22 performs the hand shape recognition on the input image supplied from the photographing unit 21 by the use of each dictionary.

The hand shape recognition unit 22 includes the hand shape specifying unit 141. The hand shape specifying unit 141 specifies the shape of a hand contained in the input image based on the score obtained through the hand shape recognition by the use of the dictionary of each hand shape.
Description of Gesture Recognition Process Next, a gesture recognition process of the image processing apparatus 131 will be described with reference to the flowchart of FIG. 12. Since the processes of step S181 to step S184 are the same as those of step S11 to step S14 in FIG. 3, the description thereof will not be repeated.

However, in step S182, the hand shape recognition unit 22 performs a filtering process on the input image and requests a score indicating the likeness of a hand with a specific shape to the dictionary of each hand shape. That is, the highest score is considered to be the score of the hand shape recognition performed using the dictionary among the stores of the regions of the input image.

When there is one score equal to or greater than a predetermined threshold value among the scores of the shapes of the hand, it is determined in step S183 that the hand with the specific shape is detected.

When it is determined in step S183 that the hand with the specific shape is detected, the process proceeds to step S185. In step S185, the hand shape specifying unit 141 sets the hand shape with the highest score among the hand shapes subjected to the hand shape recognition as the shape of the hand detected through the hand shape recognition, and specifies the shape of the hand on the input image.

When the shape of the hand contained in the input image is specified, the processes of step S186 to step S191 are performed and the gesture recognition process ends. Since the processes of step S186 to step S191 are same as the processes of step S15 to step S20 in FIG. 3, the description thereof will not be repeated.

However, in step S186, the result of the hand shape recognition on the shape of the hand specified in step S185 and the color information generated based on the result of the hand shape recognition by the color extraction unit 41 are retained as the hand detection information in the hand detection information retaining unit 23.

Figure 12:
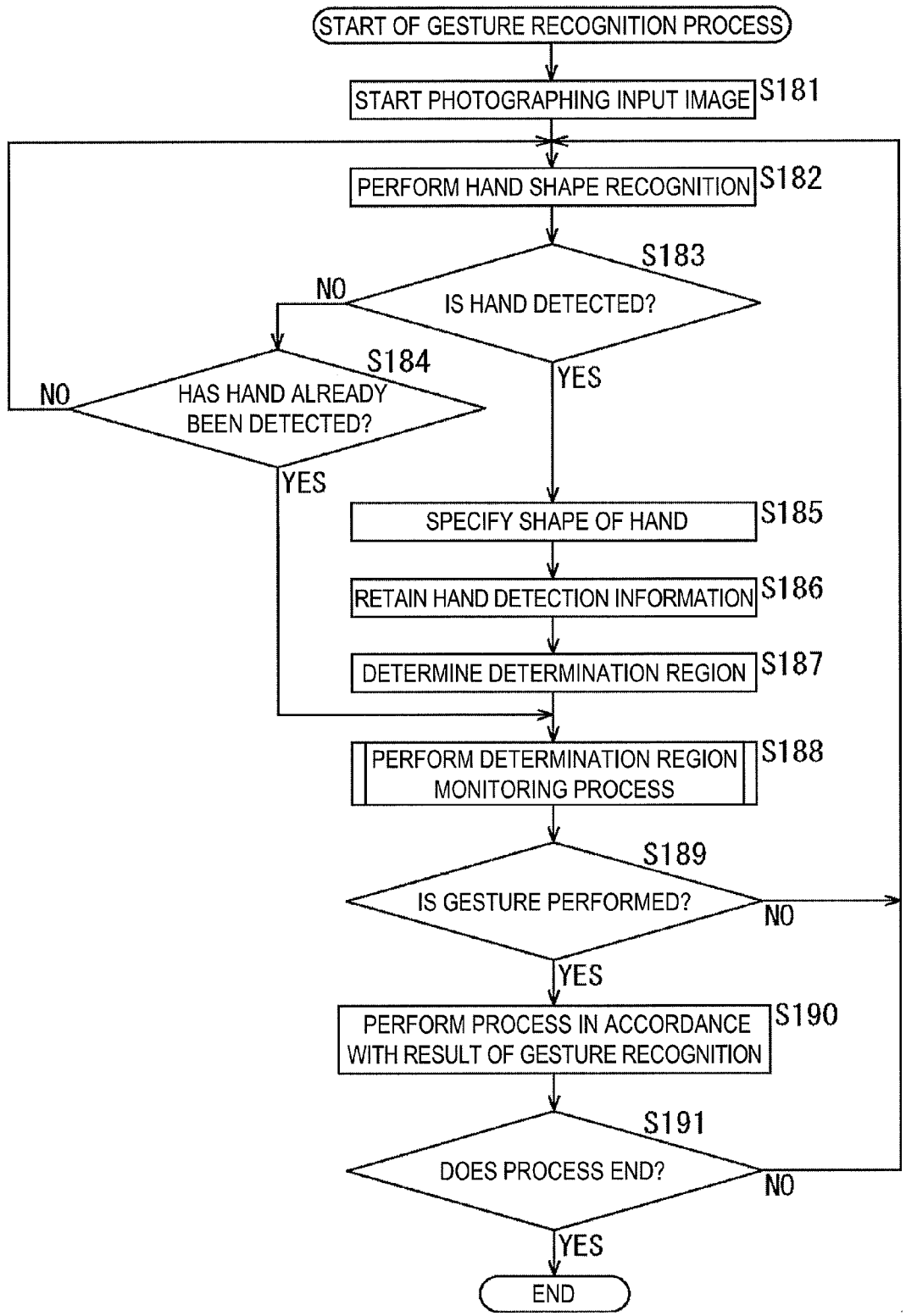
FIG. 12 is a flowchart illustrating a gesture recognition process.

In the gesture recognition process of FIG. 12, the hand detection information retained in the hand detection information retaining unit 23 is updated to the hand detection information of a different shape of the hand, whenever the hand with a different shape is detected.

In step S187, a suitable determination region is set for each specified shape of the hand, that is, each gesture to be recognized. For example, when the hand with the grip shape indicated by the arrow A11 in FIG. 10 is detected, the determination regions DR21-1 and DR21-2 are set, as indicated by the arrow B11. When it is specified that the thumb or the index finger is moved to both determination regions, it is determined that the gesture is performed.

Figure 4:
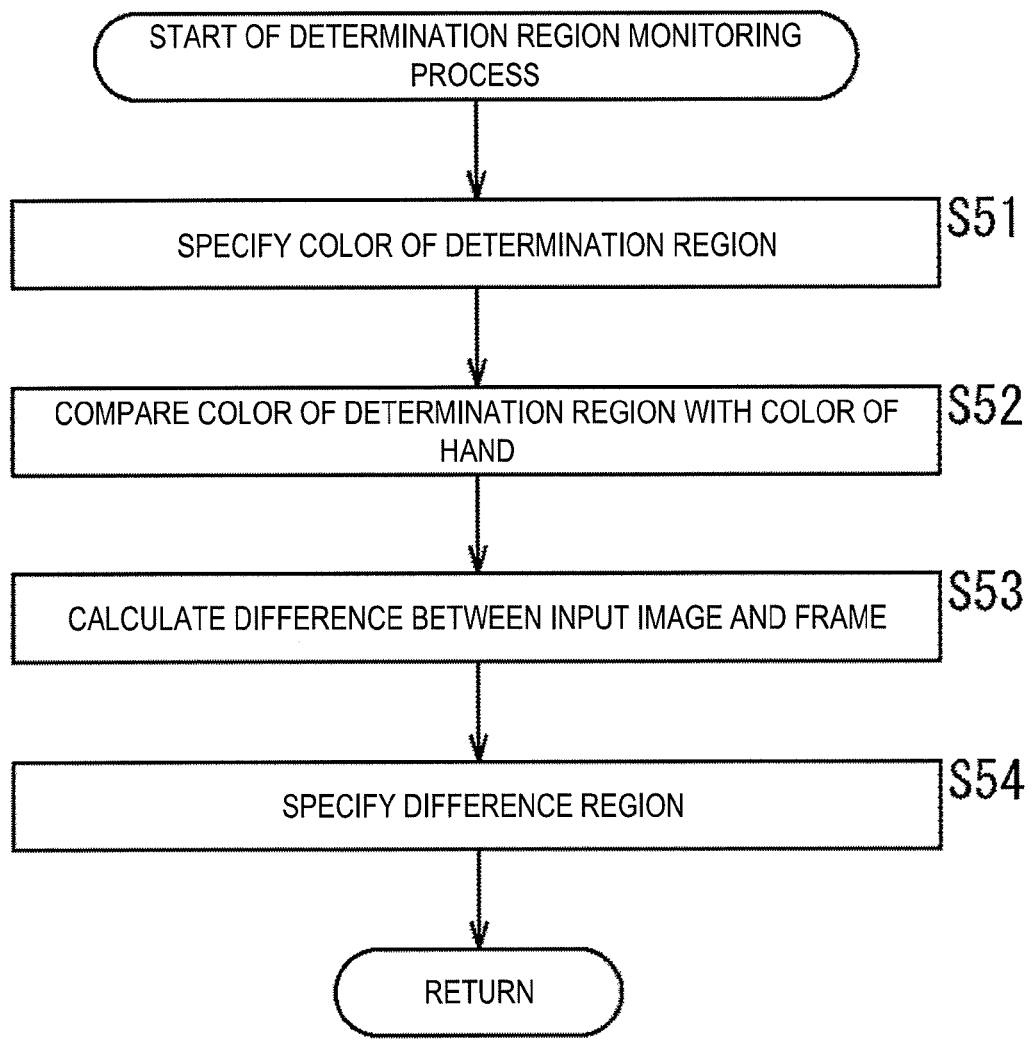
FIG. 4 is a flowchart illustrating a determination region monitoring process.

In step S188, the same process as the determination region monitoring process described with reference to FIG. 4 is performed.

Thus, the image processing apparatus 131 recognizes the gesture of the user by detecting the hand with one of the plurality of shapes from the input image, setting the determination regions based on the detection result, and monitoring the movement of the hand to the determination region. By setting the determination regions for each of the detected shapes of the hand based on the result of the hand shape detection, the suitable determination regions can be determined for each gesture. Accordingly, the gesture can be recognized at high speed and with high accuracy.

Second Modified Example

Description of Gesture Recognition Process

Even in the gesture recognition process of the image processing apparatus 131, only the gesture recognition may be performed only for a given period after the hand is detected through the hand shape recognition.

Figure 13:
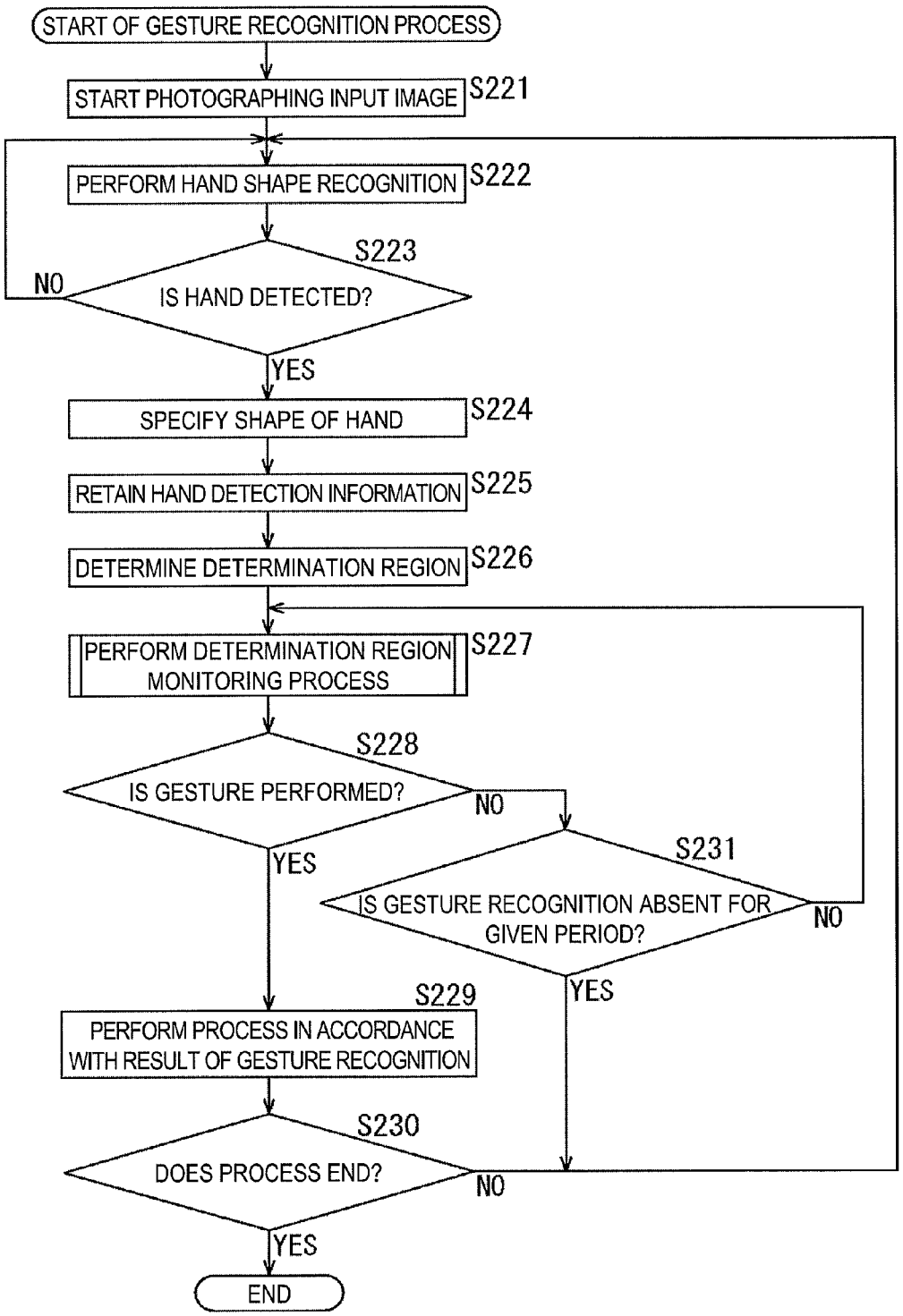
FIG. 13 is a flowchart illustrating a gesture recognition process.

In this case, the image processing apparatus 131 performs a gesture recognition process shown in FIG. 13. Hereinafter, the gesture recognition process of the image processing apparatus 131 will be described with reference to the flowchart of FIG. 13.

Since the processes of step S221 to step S223 are the same as those of step S81 to step S83 in FIG. 5, the description thereof will not be repeated.

However, in step S222, the hand shape recognition unit 22 performs the hand shape recognition by the use of the dictionary of each hand shape, as in the process of step S182 in FIG. 12. In step S223, when there is one score equal to or greater than a predetermined threshold value among the scores of the shapes of the hand, it is determined that the hand with the specific shape is detected.

When it is determined in step S223 that the hand with the specific shape is detected, in step S224, the hand shape specifying unit 141 specifies the shape of the hand on the input image based on the result of the hand shape recognition of each hand shape. That is, in step S224, the same process as that of step S185 in FIG. 12 is performed.

When the shape of the hand is specified, the processes of step S225 to step 231 are performed and the gesture recognition process ends. Since the processes of step S225 to step 231 are same as the processes of step S84 to step S90 in FIG. 5, the description thereof will not be repeated. However, in step S225, as in step S186 of FIG. 12, the result of the hand shape recognition on the specified shape of the hand shape and the color information generated based on the result of the hand shape recognition are retained as the hand detection information in the hand detection information retaining unit 23. In step S227, the same process as the determination region monitoring process described with reference to FIG. 4 is performed.

Thus, the image processing apparatus 131 detects the hand with one of the plurality of shapes from the input image and recognizes the gesture of the user based on the detection result.

Fifth Embodiment

Example of Configuration of Image Processing Apparatus

Figure 14:
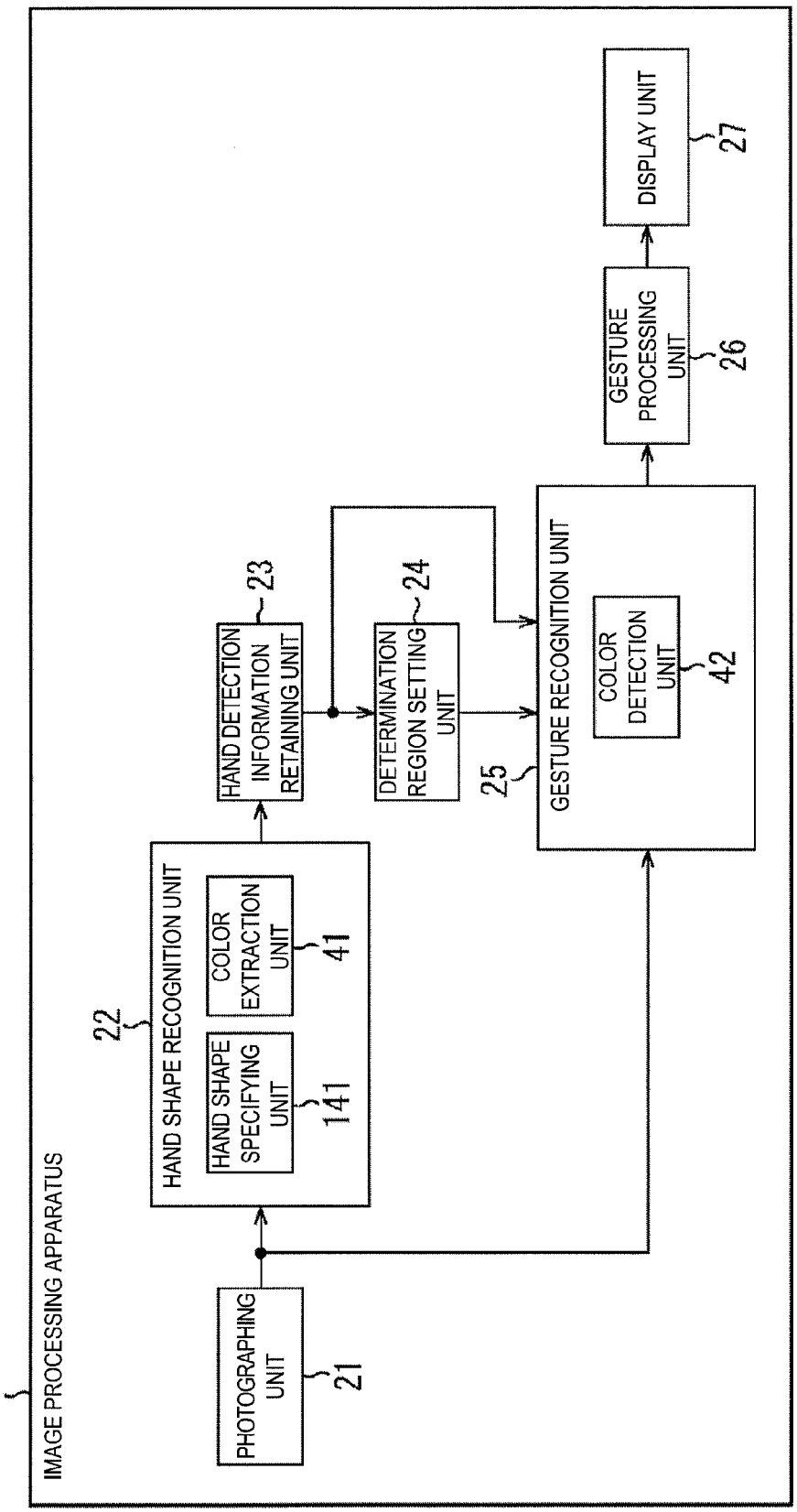
FIG. 14 is a diagram illustrating still another example of the configuration of an image processing apparatus.

Even when the plurality of shapes of the hand are set as the shapes of the hand to be recognized, the gesture may be recognized using only the color of the user's hand. In this case, an image processing apparatus has a configuration shown in FIG. 14. In FIG. 14, the same reference numerals are given to the units corresponding to the units in FIG. 11, and the description thereof will not be repeated.

An image processing apparatus 171 in FIG. 14 includes a photographing unit 21 to a display unit 27. The configuration of the image processing apparatus 171 is different from that of the image processing apparatus 131 in that the gesture recognition unit 25 does not include the difference detection unit 43. The remaining configuration of the image processing apparatus 171 is the same as that of the image processing apparatus 131.

Description of Gesture Recognition Process

The image processing apparatus 171 also performs the same process as the gesture recognition process described with reference to FIG. 12. However, in the determination region monitoring process of step S188, it is monitored whether the region with the color of the user's hand is moved to the determination region. That is, the determination region monitoring process described with reference to FIG. 7 is performed.

Accordingly, for example, in step S189, it is determined that the gesture is performed by the user, when the color of the determination region is the color of the user's hand indicated by the color information.

The image processing apparatus 171 may perform the gesture recognition process described with reference to FIG. 13. In this case, in step S221 to step S231, basically the same processes as the processes performed by the image processing apparatus 131 are performed. However, in step S227, the determination region monitoring process described with reference to FIG. 7 is performed. Further, in step S228, when the color of the determination region is the color of the user's hand indicated by the color information, it is determined that the gesture is performed by the user.

Sixth Embodiment

Example of Configuration of Image Processing Apparatus

Figure 15:
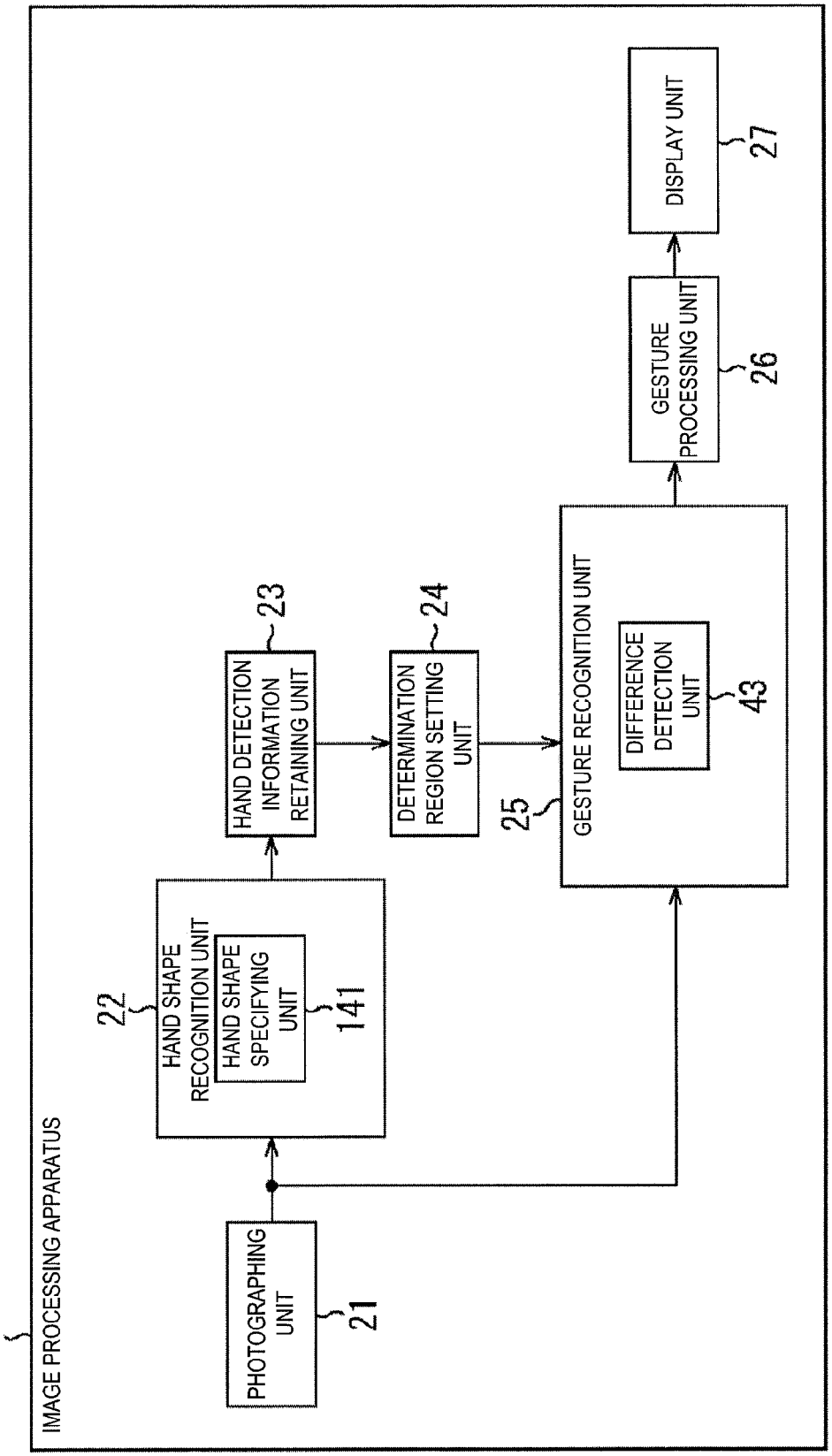
FIG. 15 is a diagram illustrating still another example of the configuration of an image processing apparatus.

When the plurality of shapes of the hand are set as the shapes of the hand to be recognized, only the difference information of the input image may be used in the gesture recognition. In this case, the image processing apparatus has a configuration shown in FIG. 15. In FIG. 15, the same reference numerals are given to the units corresponding to the units in FIG. 11, and the description thereof will not be repeated.

An image processing apparatus 201 in FIG. 15 includes a photographing unit 21 to a display unit 27. The configuration of the image processing apparatus 201 is different from that of the image processing apparatus 131 in that the hand shape recognition unit 22 does not include the color extraction unit 41 and the gesture recognition unit 25 does not include the color detection unit 42. The remaining configuration of the image processing apparatus 201 is the same as that of the image processing apparatus 131.

In the image processing apparatus 201, the hand detection information retained in the hand detection information retaining unit 23 does not include the color information and the hand detection information is not supplied to the gesture recognition unit 25.

Description of Gesture Recognition Process

The image processing apparatus 201 also performs the same process as the gesture recognition process described with reference to FIG. 12. However, in step S186, information regarding the shape, size, and position of the hand obtained as the result of the hand shape recognition is retained as the hand detection information in the hand detection information retaining unit 23.

In the determination region monitoring process of step S188, it is monitored whether the region of the user's hand is moved to the determination region based on the difference information of the input image. That is, the determination region monitoring process described with reference to FIG. 9 is performed. Accordingly, in step S189, it is determined that the gesture is performed by the user, when a part or the entirety of the determination region is contained in the difference region.

The image processing apparatus 201 may perform the gesture recognition process described with reference to FIG. 13. In this case, in step S221 to step S231, basically the same processes as the processes performed by the image processing apparatus 131 are performed.

However, in step S225, the hand detection information is generated from the result of the hand shape recognition. In step S227, the determination region monitoring process described with reference to FIG. 9 is performed. In step S228, it is determined that the gesture is performed by the user when a part or the entirety of the determination region is contained in the difference region.

Seventh Embodiment

Example of Configuration of Image Processing Apparatus

The cases in which the hand is detected through the hand shape recognition have been described above. However, when the color of the user's hand can be inferred, the gesture may be recognized using only the color information of the hand.

Figure 16:
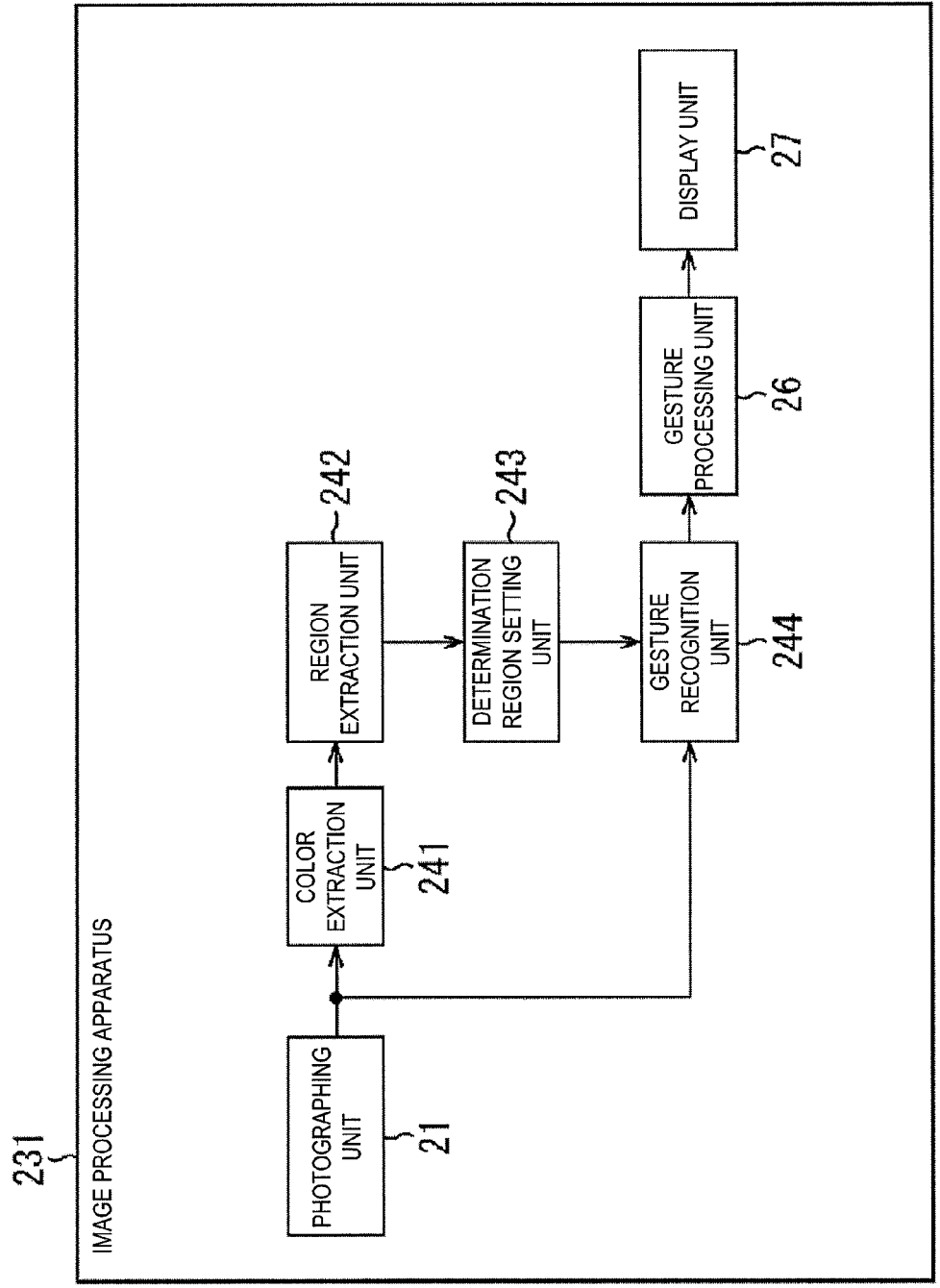
FIG. 16 is a diagram illustrating still another example of the configuration of an image processing apparatus.

In this case, the image processing apparatus has a configuration shown in, for example, FIG. 16. In FIG. 16, the same reference numerals are given to the units corresponding to the units in FIG. 2, and the description thereof will not be repeated.

An image processing apparatus 231 in FIG. 16 includes a photographing unit 21, a color extraction unit 241, a region extraction unit 242, a determination region setting unit 243, a gesture recognition unit 244, a gesture processing unit 26, and a display unit 27.

The color extraction unit 241 extracts a pixel of a color registered as the color of the user's hand in advance from the input image supplied from the photographing unit 21, and then supplies the extraction result to the region extraction unit 242. The region extraction unit 242 extracts the region of the user's hand from the input image based on the extraction result of the color of the user from the color extraction unit 241, and then supplies the region of the user's hand to the determination region setting unit 243.

The determination region setting unit 243 sets the determination region based on the region of the user's hand supplied from the region extraction unit 242, and then supplies the determination region to the gesture recognition unit 244. The gesture recognition unit 244 recognizes a gesture performed by the user based on the input image from the photographing unit 21 and the determination region from the determination region setting unit 243, and then supplies the recognition result to the gesture processing unit 26.

Description of Gesture Recognition Process

Figure 17:
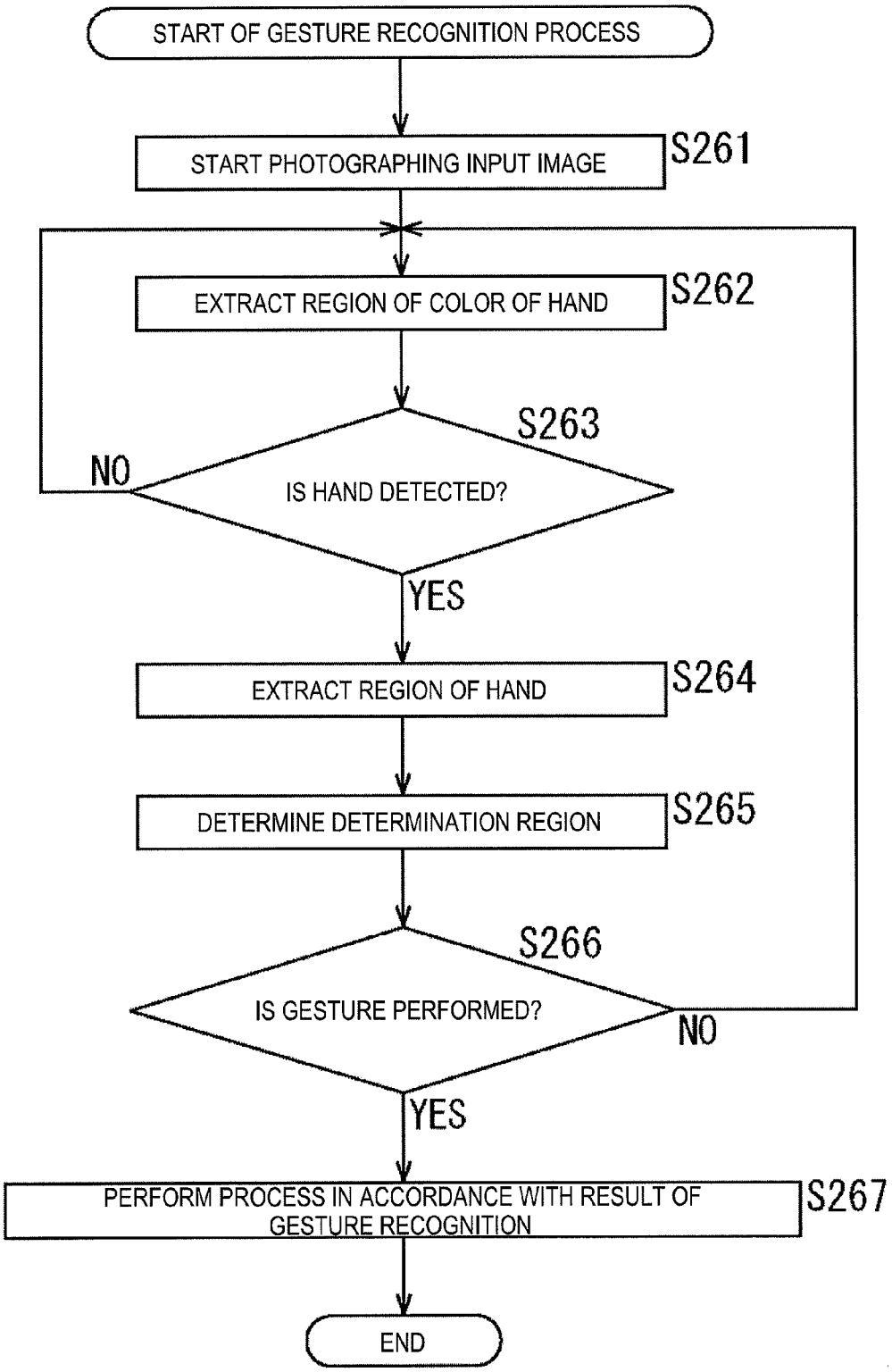
FIG. 17 is a flowchart illustrating a gesture recognition process.

Next, a gesture recognition process of the image processing apparatus 231 will be described with reference to the flowchart of FIG. 17.

In step S261, the photographing unit 21 starts photographing the input image. The photographing unit 21 supplies the input image obtained through the photographing to the color extraction unit 241 and the gesture recognition unit 244 in sequence.

In step S262, the color extraction unit 241 extracts the region (pixel) of the color registered as the color of the user's hand in advance from the input image supplied from the photographing unit 21.

In step S263, the color extraction unit 241 determines whether the user's hand is detected from the input image based on the extraction result of the color of the user's hand obtained from the input image. For example, when a region having the color of the user's hand and equal to or greater than a predetermined size is present on the input image, it is determined that the user's hand is detected.

When it is determined in step S263 that the user's hand is not detected, the process returns to step S262 and the above-described processes are repeated.

Conversely, when it is determined in step S263 that the user's hand is detected, the color extraction unit 241 supplies the extraction result of the pixel of the color of the user's hand obtained from the input image to the region extraction unit 242, and then the process proceeds to step S264.

In step S264, the region extraction unit 242 extracts the region of the user's hand from the input image based on the extraction result of the color of the hand obtained by the color extraction unit 241, extracts the region of the user's hand from the input image, and then supplies the region of the user's hand to the determination region setting unit 243. For example, the region extraction unit 242 extracts a region, such as the largest region, which is highly likely to be the user's hand, among the regions with the pixel with the color of the user's hand on the input image as the region of the user's hand.

In step S265, the determination region setting unit 243 determines the determination region based on the region of the user's hand supplied from the region extraction unit 242 and supplies the determination region to the gesture recognition unit 244. Specifically, the central position of the region of the user's hand and the height, width, or the like of the user's hand are calculated from the regions of the user's hand on the input image. For example, the determination regions located at the positions and having a size in accordance with the gesture to be recognized are set at the positions right and left from the central position of the region of the user's hand by only the distance determined by the width of the user's hand.

In step S266, the gesture recognition unit 244 determines whether a gesture is performed by the user based on the input image from the photographing unit 21 and the determination regions from the determination region setting unit 243.

For example, the gesture recognition unit 244 recognizes the gesture of the user based on at least one of the region of the user's hand and the difference region of the input image.

For example, the gesture recognition unit 244 determines that the gesture is performed by the user when the region of the user's hand on the input image is moved to the set determination region and the region of a moving subject obtained by a difference between continuous frames of the input image is moved to the determination region.

When the gesture recognition unit 244 determines that the gesture is not performed in step S266, the process returns to step S262 and the above-described processes are repeated.

In contrast, when the gesture recognition unit 244 determines that the gesture is performed in step S266, the gesture recognition unit 244 supplies the result of the recognition of the gesture performed by the user to the gesture processing unit 26 and the process proceeds to step S267.

In step S267, the gesture processing unit 26 performs a process in accordance with the result of the gesture recognition from the gesture recognition unit 244 and the gesture recognition process ends. For example, the gesture processing unit 26 displays an image representing the result of the gesture recognition on the display unit 27 or changes the channel of a program displayed on the display unit 27 in response to the gesture.

Thus, the image processing apparatus 231 recognizes the gesture of the user by extracting the region of the specific color from the input image, detecting the region of the user's hand, and setting the determination region based on the detection result. Accordingly, by setting the determination region based on the detection result of the user's hand, the gesture can be recognized at higher speed and with higher accuracy.

The above-described series of processes may be performed by hardware or software. When the series of processes are performed by software, a program for the software is installed on, for example, a computer in which dedicated hardware is embedded and a general personal computer capable of executing various functions by installing various programs from a program recording medium.

Figure 18:
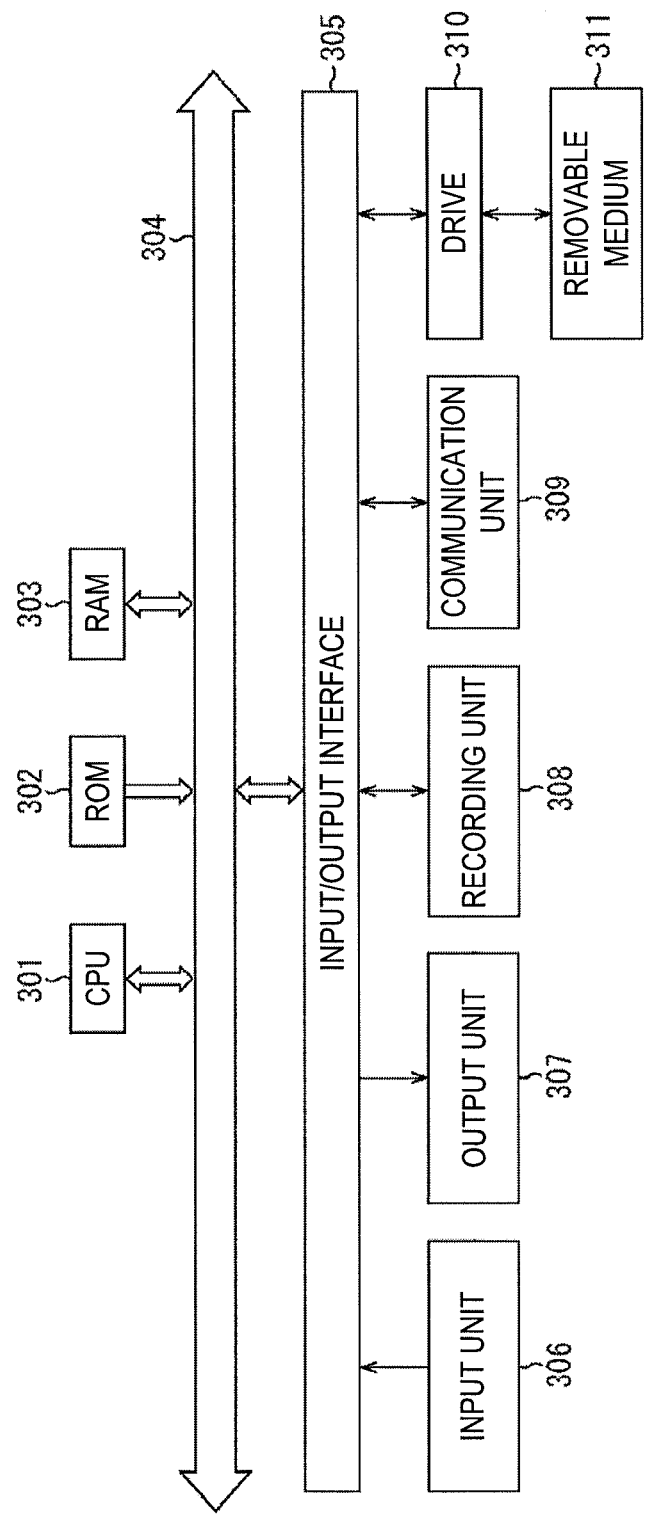
FIG. 18 is a diagram illustrating an example of the configuration of a computer.

FIG. 18 is a block diagram illustrating an example of the hardware configuration of a computer executing the above-described series of processes by a program.

In the computer, a central processing unit (CPU) 301, a read-only memory (ROM) 302, and a random access memory (RAM) 303 are connected to each other via a bus 304.

An input/output interface 305 is connected to the bus 304. An input unit 306 configured by a keyboard, a mouse, a microphone, or the like, an output unit 307 configured by a display, a speaker, or the like, a recording unit 308 configured by a hard disk, a non-volatile memory, or the like, a communication unit 309 configured by a network interface or the like, and a drive 310 driving a removable medium 311 such as a magnetic disk, an optical disc, a magneto-optical disc, or a semiconductor memory are connected to the input/output interface 305.

In the computer with the above-described configuration, the CPU 301 executes the above-described series of processes, for example, by loading and executing the program stored in the recording unit 308 on the RAM 303 via the input/output interface 305 and the bus 304.

For example, the program executed by the computer (the CPU 301) is recorded in the removable medium 311 as a package medium, such as a magnetic disk (including a flexible disk), an optical disc (including a compact disc-read only memory (CD-ROM) and a digital versatile disc (DVD)), a magneto-optical disc, or a semiconductor memory, for supply. Further, the program can be supplied via a wired or wireless transmission medium such as a local area network, the Internet, or digital satellite broadcast.

The program can be installed on the recording unit 308 via the input/output interface 305 by mounting the removable medium 311 on the drive 310. Further, the program can be received by the communication unit 309 via a wired or wireless transmission medium and can be installed on the recording unit 308. Further, the program can be installed in advance on the ROM 302 or the recording unit 308.

The program executed by the computer may be a program processed chronologically in the order described in the specification or a program processed in parallel or at a necessary timing when called upon.

Embodiments of the present technology are not limited to the above-described embodiments, but may be modified in various forms without departing from the gist of the present technology.

The present technology may be configured as follows.

[1] An image processing apparatus includes: a hand shape recognition unit that performs hand shape recognition on an input image to detect a position and a size of a hand with a specific shape in the input image; a determination region setting unit that sets a region in a vicinity of the hand on the input image as a determination region used to recognize a gesture performed using the hand, based on the position and the size of the hand; and a gesture recognition unit that recognizes the gesture by monitoring movement of the hand to the determination region.

[2] In the image processing apparatus described in [1], the determination region setting unit sets a plurality of the determination regions in the vicinity of the hand on the input image.

[3] In the image processing apparatus described in [2], the plurality of determination regions are regions used to recognize a plurality of the gestures different from each other.

[4] The image processing apparatus described in any one of [1] to [3] further includes a processing unit that performs a process in accordance with a result of gesture recognition.

[5] In the image processing apparatus described in any one [1] to [4], the gesture recognition unit recognizes the gesture by comparing a color extracted from a region of the detected hand with a color of the determination region on the input image.

[6] In the image processing apparatus described in any one of [1] to [4], the gesture recognition unit recognizes the gesture by monitoring the movement of the hand to the determination region based on a difference between frames of the input image.

[7] In the image processing apparatus described in any one of [1] to [6], the hand shape recognition unit detects positions and sizes of hands with a plurality of shapes determined in advance.

[8] In the image processing apparatus described in [7], when a position and a size of the hand with a specific shape are newly detected, the determination region setting unit sets the determination region based on the newly detected shape, position, and size of the hand.

The present disclosure contains subject matter related to that disclosed in Japanese Priority Patent Application JP 2011-127331 filed in the Japan Patent Office on Jun. 7, 2011, the entire content of which is hereby incorporated by reference.

What is claimed is:
1. An image processing apparatus comprising:
a hand shape recognition unit that performs hand shape recognition on an input image to detect a position and a size of a hand with a specific shape in the input image;
a determination region setting unit that sets a region in a vicinity of the hand on the input image as a determination region used to recognize a gesture performed using the hand, based on the position and the size of the hand; and a gesture recognition unit that recognizes the gesture by monitoring movement of the hand to the determination region.

2. The image processing apparatus according to claim 1, wherein the determination region setting unit sets a plurality of the determination regions in the vicinity of the hand on the input image.

3. The image processing apparatus according to claim 2, wherein the plurality of determination regions are regions used to recognize a plurality of the gestures different from each other.

4. The image processing apparatus according to claim 3, further comprising: a processing unit that performs a process in accordance with a result of gesture recognition.

5. The image processing apparatus according to claim 4, wherein the gesture recognition unit recognizes the gesture by comparing a color extracted from a region of the detected hand with a color of the determination region on the input image.

6. The image processing apparatus according to claim 4, wherein the gesture recognition unit recognizes the gesture by monitoring the movement of the hand to the determination region based on a difference between frames of the input image.

7. The image processing apparatus according to claim 6, wherein the hand shape recognition unit detects positions and sizes of hands with a plurality of shapes determined in advance.

8. The image processing apparatus according to claim 7, wherein, when a position and a size of the hand with a specific shape are newly detected, the determination region setting unit sets the determination region based on the newly detected shape, position, and size of the hand.

9. A computer-implemented image processing method of an image processing apparatus the image processing method comprising the following operations performed by at least one processor:
- detecting, by a processor, a position and size of a hand with a specific shape on an input image;
- setting, by a processor, a determination region in a vicinity of the hand on the input image based on the position and the size of the hand; and
- recognizing, by a processor a gesture performed using the hand by monitoring movement of the hand to the determination region.

10. A computer-implemented program for causing a computer to execute a process performed by at least one processor, the process including:
- performing, by a processor hand shape recognition on an input image to detect a position and a size of a hand with a specific shape in the input image;
- setting, by a processor, a region in a vicinity of the hand on the input image as a determination region used to recognize a gesture performed using the hand, based on the position and the size of the hand; and
- recognizing, by a processor, the gesture by monitoring movement of the hand to the determination region.

* * * * *